United States Patent
Al-Sheikh et al.

(10) Patent No.: US 12,488,611 B2
(45) Date of Patent: Dec. 2, 2025

(54) AUTONOMOUS SYSTEM TO PROTECT INDIVIDUALS OPERATING ELECTRICAL SYSTEMS BASED ON ARTIFICIAL INTELLIGENCE

(71) Applicant: SAUDI ARABIAN OIL COMPANY, Dhahran (SA)

(72) Inventors: Ibraheem Ahmed Al-Sheikh, Dhahran (SA); Faris Faraj Al-Marri, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 290 days.

(21) Appl. No.: 18/463,769

(22) Filed: Sep. 8, 2023

(65) Prior Publication Data

US 2025/0087013 A1    Mar. 13, 2025

(51) Int. Cl.
| | |
|---|---|
| *G06V 40/10* | (2022.01) |
| *G06V 10/764* | (2022.01) |
| *G06V 10/774* | (2022.01) |
| *G06V 10/82* | (2022.01) |
| *G06V 20/52* | (2022.01) |
| *G08B 25/00* | (2006.01) |

(52) U.S. Cl.
CPC ............ *G06V 40/10* (2022.01); *G06V 10/764* (2022.01); *G06V 10/774* (2022.01); *G06V 10/82* (2022.01); *G06V 20/52* (2022.01); *G08B 25/00* (2013.01)

(58) Field of Classification Search
CPC .... G06V 40/10; G06V 10/764; G06V 10/774; G06V 10/82; G06V 20/52; G08B 25/00; G08B 21/02; G08B 21/0476
USPC ........................................................ 382/103
See application file for complete search history.

(56) References Cited

U.S. PATENT DOCUMENTS

| | | | |
|---|---|---|---|
| 8,384,548 B2 | 2/2013 | Knopf et al. | |
| 2022/0254208 A1* | 8/2022 | Senese | ............... G07C 9/00912 |
| 2023/0410526 A1* | 12/2023 | Sonawane | ............. G06T 7/0008 |

FOREIGN PATENT DOCUMENTS

| | | |
|---|---|---|
| CN | 107103437 A | 8/2017 |
| CN | 109218673 A | 1/2019 |

* cited by examiner

*Primary Examiner* — Charlotte M Baker
(74) *Attorney, Agent, or Firm* — Osha Bergman Watanabe & Burton LLP

(57) ABSTRACT

A method of protecting individuals working at an electrical circuit includes: acquiring image data about an area of risk with an image acquisition device; identifying a human who is in or is about to enter the area of risk based on the image data; determining whether each identified human is wearing personal protective equipment (PPE) based on the image data; and permitting operation on the electrical circuit upon concluding that the each identified human is wearing the PPE. The electrical circuit poses a risk of physical injury to a human in the area of risk from an arc flash.

17 Claims, 13 Drawing Sheets

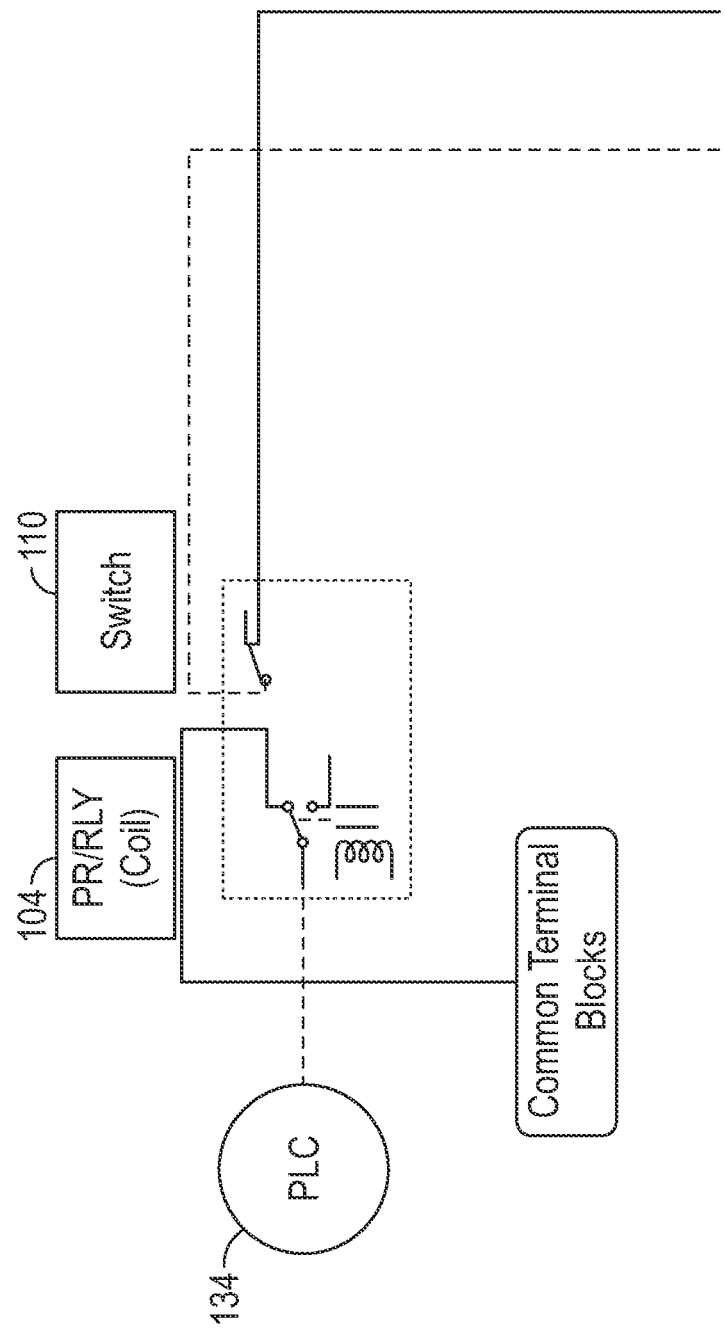

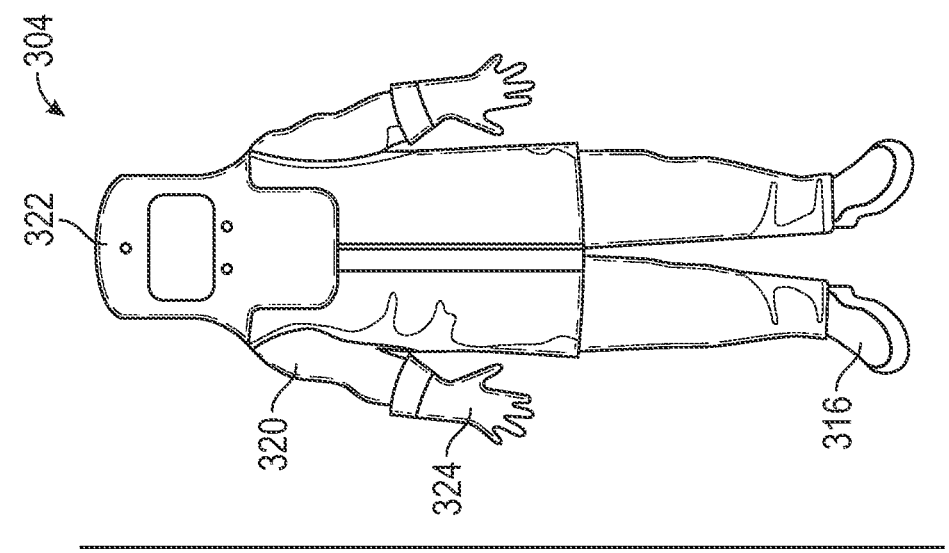
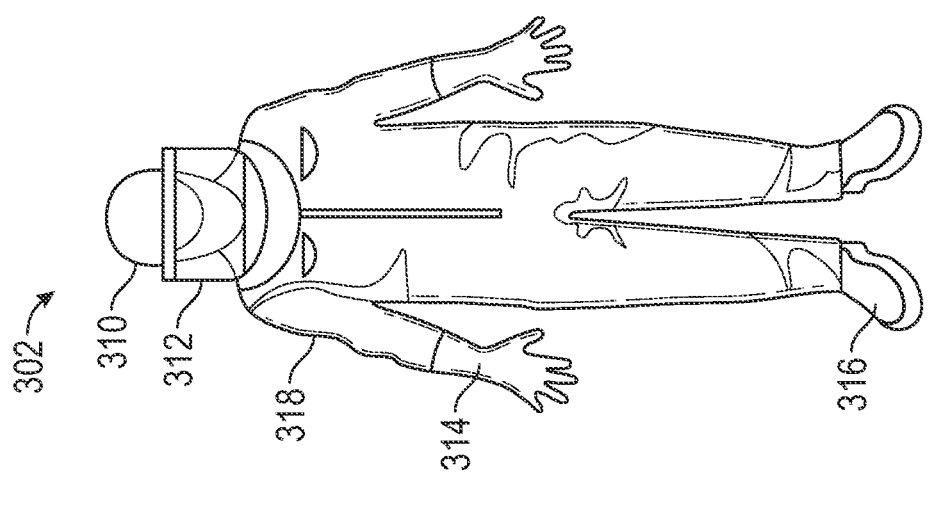
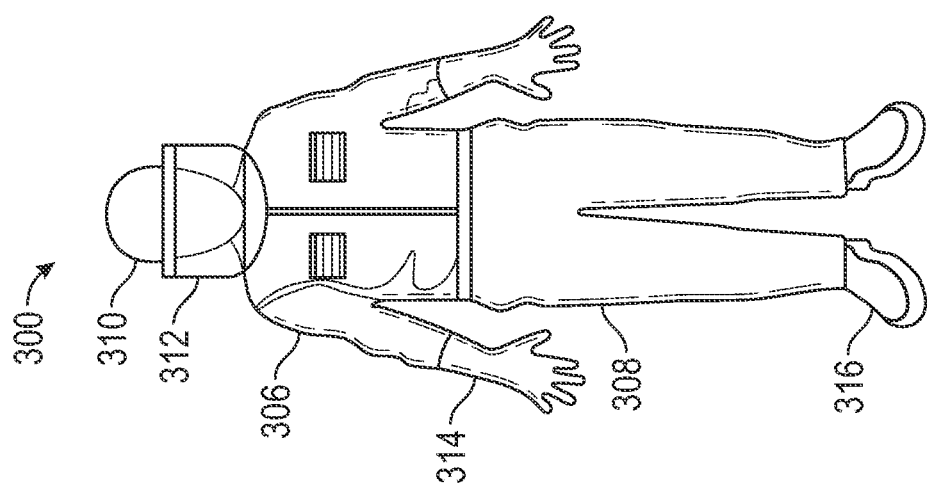
FIG. 3

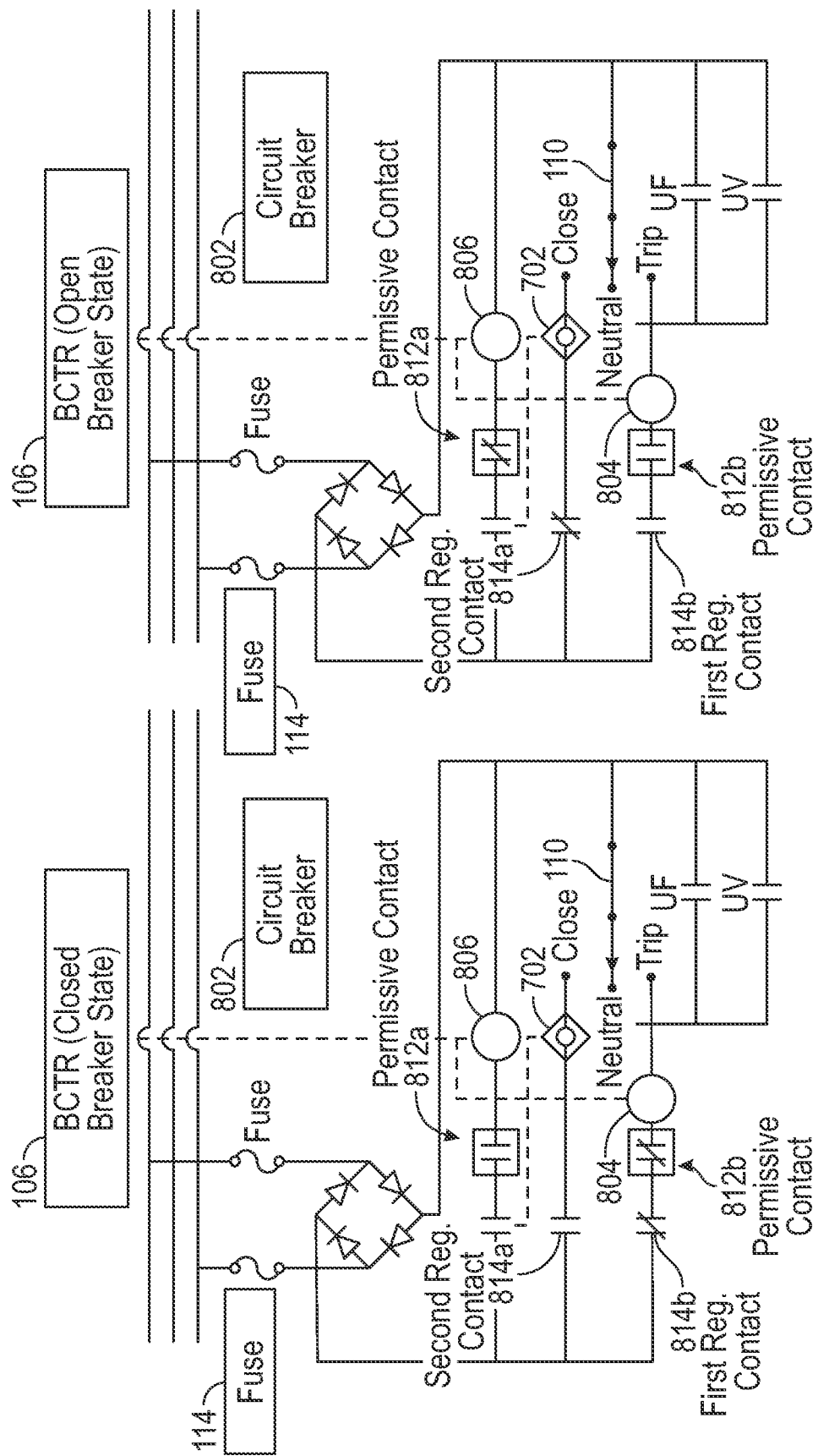

AUTONOMOUS SYSTEM TO PROTECT INDIVIDUALS OPERATING ELECTRICAL SYSTEMS BASED ON ARTIFICIAL INTELLIGENCE

BACKGROUND

Electrical injuries from electrical circuits cause not only severe physical demise from electrical shock, electrocution, falls, and burns, but also sizable economic loss. One type of electrical injury results from arc flashes in a facility environment. Arc flashes are bright electrical discharges through the air when high voltages exist across a gap between conductors. Arc flashes are a highly dangerous condition and a severe health hazard. The Occupational Safety and Health Administration (OSHA) obligates the use of Personal Protective Equipment (PPE) during any work around energized electrical circuits. In reality, safety measures against arc flashes are not completely implemented and often neglected by electrical workers.

In view of the increase of occupational mortality related to electrical accidents, it is of great advantage to have a safety system that prevents electrical injuries and loss of lives. In particular, it is not always possible to secure experienced personnel or a guard on the spot to timely enforce the PPE regulation and identify emergency electrical incidents if there is any. Accordingly, there exists a need for a method and a safety system for autonomously enforcing the PPE regulation and preventing occupational deaths from attending to electrical equipment.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, one or more embodiments relate to a method to protect individuals working at an electrical circuit. The method includes: acquiring image data about an area of risk with an image acquisition device; identifying a human who is in or is about to enter the area of risk based on the image data; determining whether the identified human is wearing PPE based on the image data; and permitting operation on the electrical circuit upon concluding that each of the identified human is wearing the PPE. The electrical circuit poses a risk of physical injury to a human in the area of risk from an arc flash.

In another aspect, one or more embodiments relate to a system to protect individuals working at an electrical circuit. The system includes: a hardware processor of a computer that: receives image data about an area of risk acquired by an image acquisition device, identifies a human who is in or is entering the area of risk based on the image data, determines whether the identified human is wearing required PPE based on the image data, and transmits a command signal that permits operation on an electrical circuit upon determining that each of the identified human is wearing the required PPE; and the image acquisition device that acquires the image data of the area of risk and transmits the image data to the hardware processor. The electrical circuit poses a risk of physical injury to a human in the area of risk from an arc flash.

Other aspects and advantages of the claimed subject matter will be apparent from the following description and the appended claims.

BRIEF DESCRIPTION OF DRAWINGS

Specific embodiments of the invention will now be described in detail with reference to the accompanying figures. Like elements in the various figures are denoted by like reference numerals for consistency. Like elements may not be labeled in all figures for the sake of simplicity. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

FIGS. 1A and 1B show schematic diagrams of an electrical circuit with a safety system in accordance with one or more embodiments.

FIG. 3 shows schematic front views of workers wearing PPE in accordance with one or more embodiments.

FIGS. 8A and 8B show schematic diagrams showing an implementation of the safety system with a circuit breaker and a switch in accordance with one or more embodiments.

DETAILED DESCRIPTION

Figure 1A:
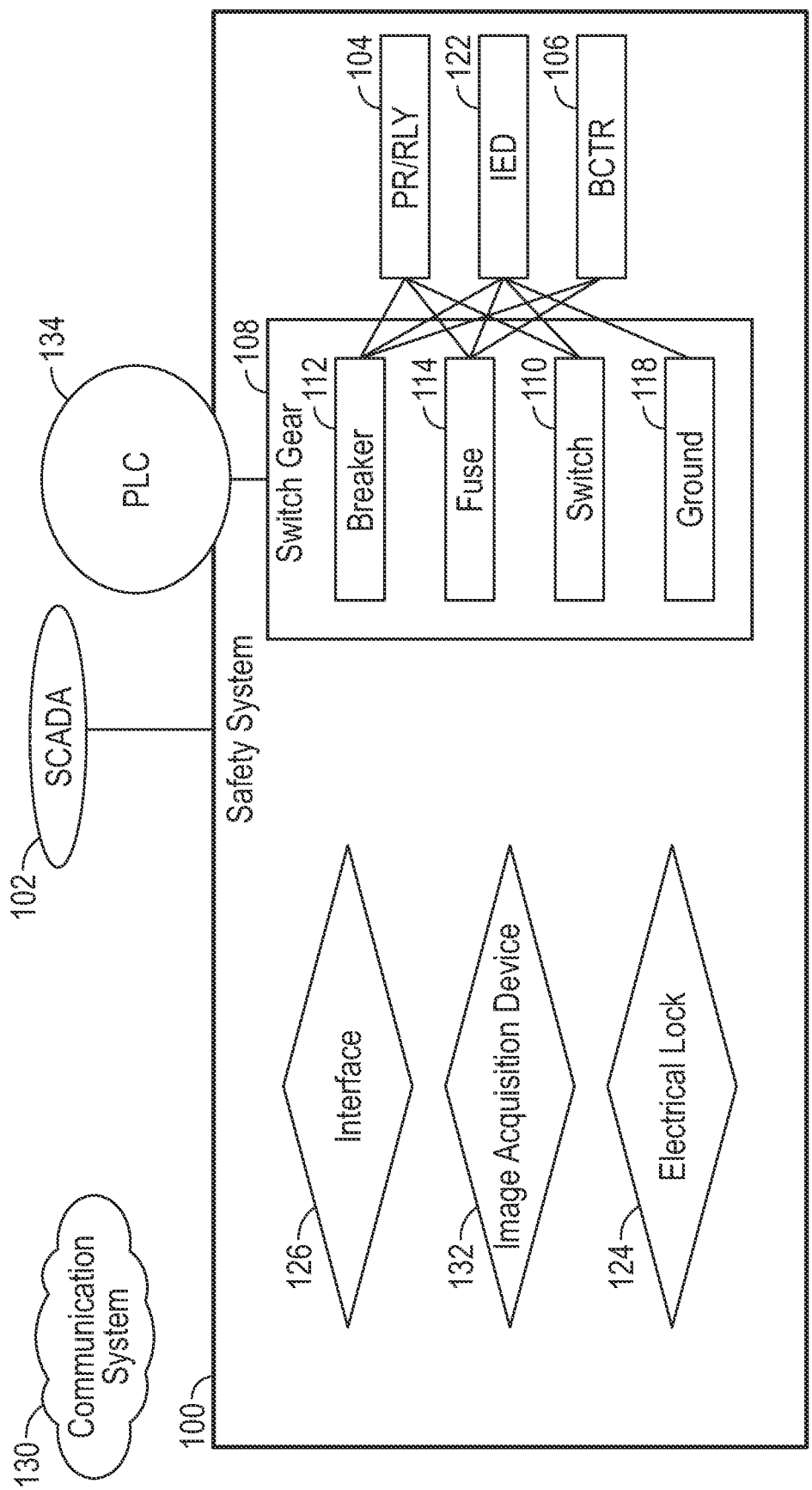

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (for example, first, second, third) may be used as an adjective for an element (that is, any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope of the invention should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

In this disclosure, the term "algorithm" is used to mean "software," "program," "instructions to computing devices," "network," "system," and the like, in a context-depending manner. The term "processor" includes "hardware processor," "coprocessor," "manycore," and "hardware processors located at a server." The term "database" refers to any repository or data structure capable of storing information. The term "network" may mean "communication network" in certain contexts, but also "system," "chain," "circuit," "assembly," and the like in other contexts. The term "arc flash" may include electromechanical incidents, reactions, conditions, phenomena such as "electrical shock," "electrocution," "thermal burst," "arc blast," and the like.

A breakdown of electrical resistance in the air surrounding a conductor, for example, by a human error, may result in a short circuit electric arc. And energized electrical conductors and circuit parts operating at voltages equal to or greater than 50 may cause arc flashes. A sudden and violent electrical discharge occurs because high voltages exist across a gap between conductors. As such, workers may experience burns and even electrocution due to the released electrical currents and thermal energy of the arc flash. Anti-arc flash protections should be put in place for workers operating on energized electrical circuits. However, a worker who is not familiar with safety procedures may fail to follow mandatory PPE guidelines and suffer from a life-threatening trauma.

An autonomous safety system enhances safety of workers by preventing arc flash injuries to those who are located or disposed in an area at risk of an arc flash, and by detecting incidents when an arc flash has caused injuries to workers. The safety system may generate a human identification model (HIM) that detects a human in an image along with a PPE determination model (PDM) that determines whether each human worker is wearing the PPE based on the image. The safety system may acquire image data of a certain area of risk with an image acquisition device and identify a person who is in or is entering the area of risk, using the HIM. The safety system may then determine whether each identified person is wearing the PPE, using the PDM. Upon determining that each and all of the person is wearing the PPE, the safety system may transmit a command signal that permits operation on an electrical circuit by the person.

Referring to FIG. 1A, a schematic diagram of the electrical circuit with the safety system 100 according to one or more embodiments is depicted. The safety system 100 may be implemented with aid of artificial intelligence in an electrical circuit. In such implementations, an AI-enabled circuit may be considered as a part of the safety system 100, as the AI-enabled circuit collects and processes image data obtained by an image acquisition device 132 (e.g., camera). The AI-enabled circuit may function as Edge computing in relation to the image acquisition device 132. Those skilled in the art will appreciate that in the event that a single camera cannot visibly see all individuals at the site (area of risk), multiple cameras may be employed to have full spectrum of the site.

Optionally, the safety system 100 may receive inputs from supervisory control and data acquisition (SCADA) 102 and other devices in the electrical circuit to determine whether, when, and where arc flashes may possibly occur in the electrical circuit. SCADA 102 may provide the safety system 100 with specifications and operational parameters of other devices that are stored in the switchgear enclosure.

The safety system 100 may transmit information about changes in the electrical circuit to SCADA 102. The safety system 100 may communicate with other devices in the switchgear enclosure via a communication system 1030.

Intelligent electronic device (IED) 122 is a data processing device that identifies the status of other devices and protects the electrical circuit from destructive conditions. For example, IEDs 122 may record faults in the electrical circuit, detect short circuit currents, and identify the source of the short circuit. The safety system 100 may receive information from the IED 122.

The protection relays, or line protection relays (PR/RLY) 104 are commonly utilized IEDs 122. PR/RLY 104 monitors and detects abnormality. PR/RLY 104 contains monitoring procedures to detect faults, PR/RLY 104 may communicate with the safety system 100.

In some implementations, the safety system 100 may collect outputs and data previously or contemporaneously submitted by a breaker controller (BCTR) 106. When fault conditions are detected, IEDs 122 may record abnormal parameters, and the safety system 100 may receive recorded data from sensors or IEDs 122.

In some implementations, PR/RLY 104 may detect a fault condition in the electrical circuit. Upon detecting the fault condition, the safety system 100 may alarm IEDs 122 to tighten restrictions over a worker's access to the electrical circuit.

Still at FIG. 1A, in accordance with one or more embodiments, the safety system 100 may first determine an area where the risk of physical harm, for example in cases of an arc flash, is found. For example, areas within specified distances from the switchgear 108, a switchboard, an auto transfer switch, a motor starter, etc. may be included in the area of risk. An image acquisition device 132 (e.g., multiple cameras, stream cameras that are installed at or near the area of risk of electrical hazards being monitored) may stream real-time images as image data to the safety system 100. In one or more embodiments, the safety system 100 may process these images/videos and identify a human and calculate a distance between the switchgear 108 and the human (worker) based on image data captured by the image acquisition device 132.

The switchgear 108 contains of a number of circuit breakers 112 and each is located in an enclosure (a cubical compartment) with its associated electrical components. A heat and frame-resistant door of the switchgear 108 provides safeguarded against injuries from electrical currents. Accordingly, opening of the switchgear enclosure may trigger an arc-flash and cause severe harm to workers who are not wearing the PPEs. However, workers may unlock a mechanical lock and open the door without wearing the PPE. In general, switchgears 108 are not made to detect whether the worker is compliant with the PPE requirement.

As one or more options, the safety system 100 may require a worker who is entering the area posing a risk of a hazard to enter an employee ID, a password, and provide other relevant information (compliance with the PPE, receipt of a permit, etc.) via an interface 126. The entered information may be sent to the safety system 100 and SCADA 102 for verification.

For automated screening of the PPE requirement by workers, the safety system 100 may generate the HIM 208 on the AI-enabled circuit that detects a human in an image. In some examples, the safety system 100 may identify a person who is in or is about to enter the area of risk based on the image data, using the HIM 208.

The safety system 100 may calculate the distance between the switchgear 108 and the person who is in or is about to be in the area of risk based on the image data captured by an image acquisition device 132. The safety system 100, upon finding the distance between the switchgear 108 and the person shorter than the "limited approach boundary," or optionally "arc flash boundary" in NFPA 70E (2018), may condition the person's entry and presence in the area of risk on the satisfaction of the PPE requirement. Alternatively, any person around the image acquisition device 132 that the HIM considers a human may be required to wear PPE.

Keeping with FIG. 1A, the safety system 100 may determine whether each of the person is wearing PPE based on the image data. In one or more embodiments, the safety system 100 may generate the PDM 210 that determines whether each of the human is wearing the PPE based on the image, using artificial intelligence networks. In some examples, the safety system 100 may generate the PDM 210 on the AI-enabled circuit.

In some examples, the safety system 100 may permit operation on the electrical circuit upon concluding that each of the person is wearing the PPE because the risk of injuries from an arc flash is diminished when PPE is used.

In some embodiments, upon concluding that each of the person is wearing the PPE, the safety system 100 may open a door for the person's entry where the switchgear 108 is located. In other embodiments, the safety system 100 may transmit a command signal to PLC 134 to unlock an electrical lock 124 of the door of the switchgear enclosure upon concluding that each of the person is wearing the PPE.

Circuit breakers 112 may be positioned in the electrical circuit to deenergize or energize the electrical circuit. For example, operation on the electrical circuit in the area of risk may be conducted once the circuit breaker 112 is opened, upon the safety system's 100 determination that each of the person is wearing the PPE. As a result, each identified human is protected with the PPE, and operation on the electrical circuit may be safely performed. On the other hand, if any of the person who is in or is entering the area of risk is not wearing the PPE, the safety system 100 may not send the command signal to unlock the electrical lock 124 for the person.

In one or more embodiments, the safety system 100 transmits a command signal to PLC 134 that permits the operation on the electrical circuit. In some cases, the command signal instructs PLC 134 to change BCTR 106 from a closed breaker state (FIG. 8A) to an open breaker state (FIG. 8B). BCTR 106 may close a permissive contact 812b to a trip coil (TC) 804 as prompted, thereby changing the switch 110 to the side of the trip coil 804. The closure of the permissive contact 812b cuts off electrical current in the circuit breaker 802 and permits the operation on the electrical circuit.

In addition, the safety system 100 may control operation on the electrical circuit by controlling a lock 604 of an actuator 602 of rack handles 608. Racking in/out may trigger an arc-flash and thus harm workers if the workers are not complying with the PPE requirement. For example, the actuator 602 opens a slot for the rack handle 608 to a draw-out racking in the switchgear enclosure. In such implementations, the safety system 100 transmits a command signal that directs unlocking the actuator lock 604. Then PLC 134 may instruct the actuator 602 to pull back the latch bar 606 of the actuator lock 604. The rack handle 608 becomes operable, and the person is able to operate on the electrical circuit.

A part of, or the entirety of the safety system 100 may perform the aforementioned autonomous protection steps online (connected to the communication system 1030), or offline in other scenarios. For example, the AI-enabled circuit and the image acquisition device 132 may operate offline while other components (e.g., the hardware processor 1045) are operating online.

The AI-enabled circuit may make a determination based on predefined machine learning, either offline or online, as explained below. The image acquisition device 132, when offline, may be able to send image data to the AI-enabled circuit. The safety system 100 is able to communicate with sensors and devices in the electrical circuit, and a predefined emergency service (e.g., in cases of arc-flash incidents) when the safety system 100 is online and a pertinent component (the image acquisition device 132) transmits image data to the hardware processor 1045.

Turning to FIG. 1B, one implementation of the safety system 100 with PR/RLY 104 and the switch 110 is shown in accordance with one or more embodiments.

As shown in FIG. 1B, the safety system 100 may be implemented with a programmable logic controller (PLC)

134 that executes a set of instructions and prevents injuries from an arc flash incident. Unless the safety system 100 confirms the user's or operator's compliance with the PPE requirement, the safety system 100 may instruct PLC 134 to inhibit, by transmitting a signal to PR/RLY 104, the operation on the electrical circuit. For instance, the operation of touching the switchgear enclosure may be prohibited. PLC 134 instructs PR/RLY 104 to wait for a command signal from the safety system 100 before lifting the suspension. Optionally, PLC 134 may be controlled by the self-executing algorithm 504 that is based on the PDM 210. PLC 134 may determine whether each person is wearing the required PPE to operate the electrical equipment without the command signal from the safety system 100. Thus, the switch 110 is opened and closed according to the signal of PLC 134, which is transmitted based on, for example, the determination that each person who is in or is entering the area of risk is wearing the PPE.

Accordingly, the risk of injuries from an arc flash is mitigated by preventing the user/operator from operating the electrical circuit until the safety system 100 (or PLC 134) determines that it is safe to do so based on the PDM 210.

Figure 2A:
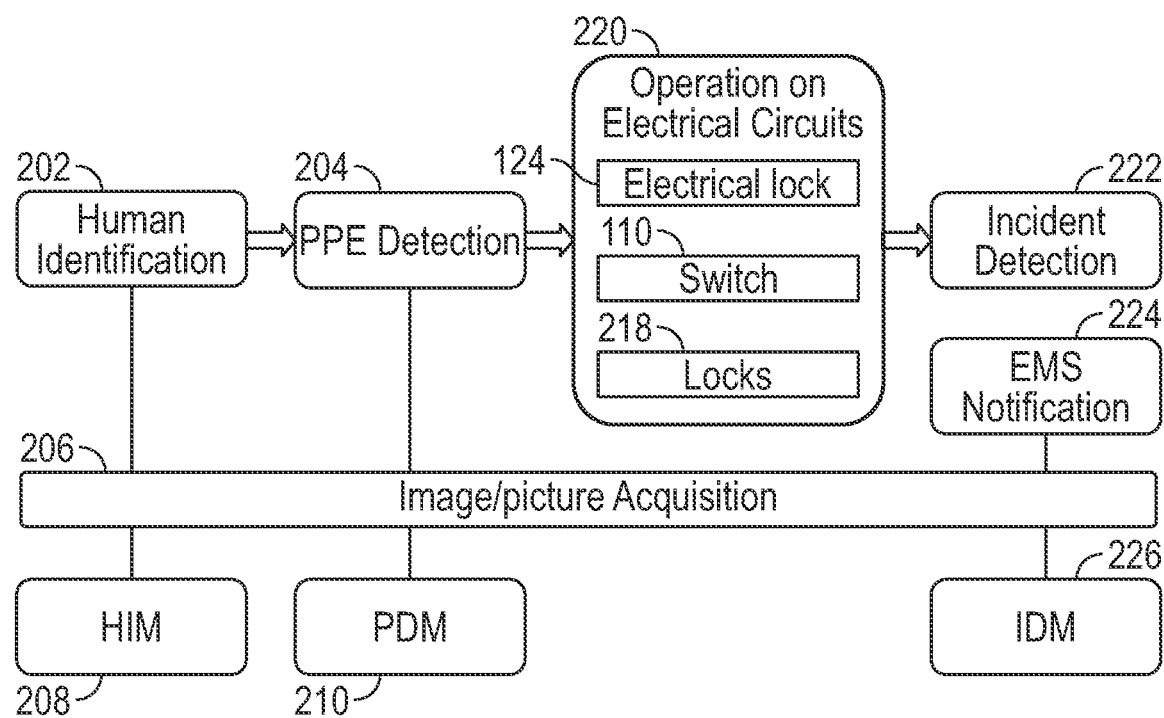
FIG. 2A shows a block diagram of operations of the safety system, in accordance with one or more embodiments.

FIG. 2A shows a block diagram summarizing the operation of the safety system 100 in accordance with one or more embodiments.

The safety system 100 may generate the HIM 208 that detects a human body in an image by image processing techniques known to those of ordinary skill in the art. In one or more embodiments, the safety system 100 may use streamed image data from a video as an input. Alternately, the safety system 100 may use historical images or CGI data. Specifically, features of pixels in one or more images may be evaluated to determine whether a human body is present in the area of risk.

Using these images, the safety system 100 may construct an artificial intelligence (AI) network and train the artificial intelligence network. Any AI network directed toward an image processing/computer vision task may be suitable for purposes of this disclosure. In one or more embodiments, the AI network may be deployed on an edge camera device. In one or more embodiments, the AI network implements one or more machine learning (ML) models and trains the ML models to detect objects in images, for example. In training the artificial intelligence network, the safety system 100 may use features of pixels of the one or more images as input into the artificial intelligence network. The safety system 100 may obtain learned classifiers of objects from the training. As explained previously, the AI-enabled circuit may be used to generate a part of, or the entirety of the HIM 208.

In some examples, the safety system 100 may generate the HIM 208, by obtaining features for each of the one or more images. The features are calculated by analyzing the gradients of the pixels, for example, by computing a magnitude of gradient and gradient orientation of the pixels. The HIM 208 may identify a frame of an identified human and return a total number of the identified humans as output.

In some implementations, the safety system 100 may acquire image data about the area of risk. The safety system 100 may receive data from the image acquisition device 132 as an image/picture is captured (Image/picture acquisition 206). For example, the safety system 100 may continuously receive image data to identify a human who is in or is entering the area of risk based on the image data, using the HIM 208 (Human Identification 202).

Optionally, the HIM 208 may be generated, and constantly and autonomously updated at the AI-enabled circuit, using the image data acquired by the image acquisition device 132.

When a person who is in or is entering the area of risk, the safety system 100 (including the AI-enabled circuit) may analyze the image data and determine the distance between the switchgear 108 and the person who is in or is about to enter the area based on the image data. Upon finding the distance between the switchgear 108 and the person shorter than the "limited approach boundary," or optionally "arc flash boundary" in NFPA 70E (2018), the safety system 100 may condition the person's entry and presence in the area of risk on compliance with the PPE requirement.

The safety system 100 may determine whether each person is wearing the PPE based on the image data, using the PDM 210 (PPE Detection 204). For example, the safety system 100 may determine the category of PPE to be worn by each person based on the image data and characteristics of the electrical circuit. The safety system 100 may determine whether each person is wearing the PPE that matches the category. As explained above, PLC 134 may execute the algorithm 504 that is based on the PDM 210 and is updated constantly.

Upon determining that each person is wearing the required PPE, the safety system 100 may permit user operation on the electrical circuit (Operation on Electrical Circuits 220). For example, the safety system 100 (or PLC 134) may unlock the electrical lock 124 of the door of the switchgear enclosure. The lock may comprise an I/O interface that receives a command signal indicating that the lock may be opened.

In circumstances in which the safety system 100 (or PLC 134) permits user operation on the electrical circuit, the safety system 100 (or PLC 134) may activate the trip coil 804 for opening the circuit breaker 802. For example, BCTR 106 may close the permissive contact 812b to allow activation of the trip coil 804. The trip coil 804 changes the circuit breaker 802 from a closed state to an open state (FIG. 8B). The person's operation on the electrical circuit is permitted.

On the other hand, the safety system 100 disallows user operation on the electrical circuit when the PPE requirement is not satisfied.

The safety system 100 (or PLC 134) may activate the close coil 806 at the end of the operation. For example, BCTR 106 may close the permissive contact 812a to the close coil 806 side via the energization of the close coil 806. The closure of the permissive contact to the close coil may close the circuit breaker 112 in the electrical circuit and disenables the operation on the electrical circuit.

Keeping with FIG. 2A, the safety system 100 (or PLC 134) may control operation on the electrical circuit by actuating the latch bar 606 (locks 218) for a rack handle 608 of the switchgear enclosure. For example, the actuator 602 opens a slot for the rack handle 608 to a draw-out racking in the switchgear enclosure. If the slot is opened, racking is unlocked.

In one or more embodiments, the safety system 100 may protect a person's health and life during the person's operation on the electrical circuit by detecting an incident where the person is struck by an arc flash or suffers a burn (Incident Detection Model (IDM) 222).

In such implementations, the safety system 100 may generate the IDM 226 that determines whether a human needs medical attention based on an image. As one or more examples, the safety system 100 may generate the IDM 226 on the AI-enabled circuit that determines whether the human needs medical attention by obtaining one or more images and by evaluating features of pixels in the one or more images. For example, the safety system 100 may construct an artificial intelligence network and train the artificial intelligence network by using at least a part of the one or more images. In some cases, the artificial intelligence network may identify a location, time, and a type of an injury suffered by the human based on the image, according to one or more embodiments. As explained above, the AI-enabled circuit may be used to generate a part of, or the entirety of the IDM 226.

In one or more implementations, the safety system 100 may obtain the image data about the area of risk being monitored acquired by the image acquisition device 132 (e.g., a stream camera) on an ongoing basis. The safety system 100 identifies a person who is in or is entering the area of risk based on the image data, using the HIM 208. The safety system 100 may determine whether the person needs medical attention, using the IDM (the determination method is explained later). Upon concluding that the person needs medical attention, the safety system 100 is configured to transmit notification to a predetermined emergency service (EMS Notification 224).

Figure 2B:
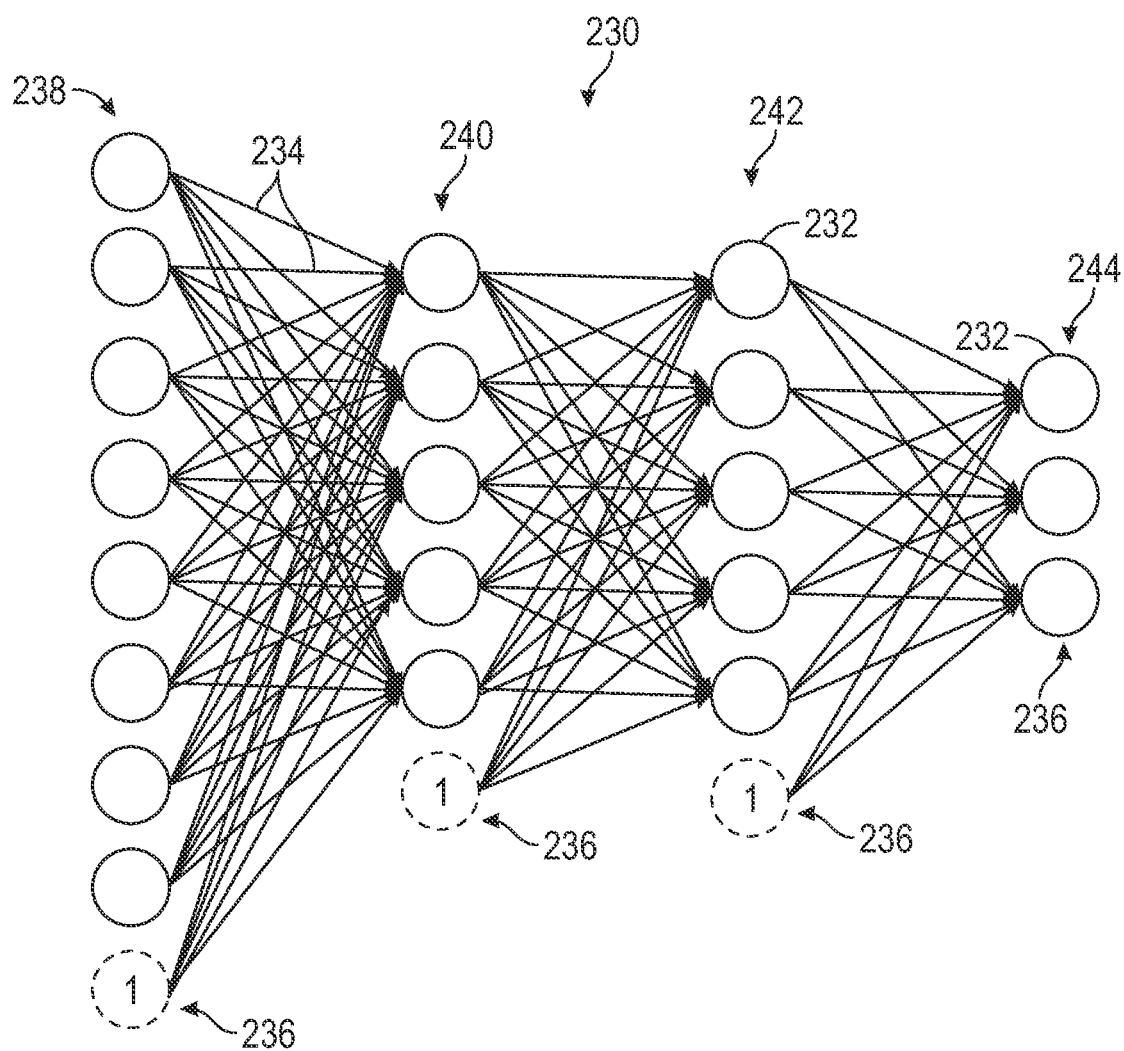
FIG. 2B shows a schematic diagram of a machine learning network.

Turning to FIG. 2B, which shows a schematic diagram of a machine learning (ML) model that may be implemented by the AI network. The following paragraphs explain how the processor of the safety system 100 may determine a type of object (e.g., a human vs. a non-human) being illustrated by a group of pixels.

Machine learning (ML), broadly defined, is the extraction of patterns and insights from data. The phrases "artificial intelligence," "machine learning," "deep learning," and "pattern recognition" are often convoluted, interchanged, and used synonymously. This ambiguity arises because the field of "extracting patterns and insights from data" was developed simultaneously and disjointedly among a number of classical arts like mathematics, statistics, and computer science. For consistency, the term machine learning, or machine learned, is adopted herein. However, one skilled in the art will recognize that the concepts and methods detailed hereafter are not limited by this choice of nomenclature.

In some embodiments, the ML model may be either a feedforward neural network (FNN), such as a traditional one directional neural network, or a recurrent neural network (RNN). Thus, a cursory introduction to NN and RNN is provided herein. However, note that many variations of an NN and an RNN exist. Therefore, one of ordinary skill in the art will recognize that any variation of an NN or an RNN (or any other ML model) may be employed without departing from the scope of this disclosure. Further, it is emphasized that the following discussions of an NN and a convolutional neural network (CNN) are basic summaries and should not be considered limiting.

The ML model may be constructed by a recurrent neural convolutional network (RCNN), such as PixelCNN. An RCNN is a specialized neural network (NN) and, from there, a specialized CNN.

A diagram of an NN is shown in FIG. 2B. At a high level, an NN 230 may be graphically depicted as being composed of nodes 232 and edges 234. The nodes 232 may be grouped to form layers. FIG. 2B displays four layers 238, 240, 242, 244 of nodes 232 where the nodes 232 are grouped into columns. However, each group need not be as shown in FIG. 2B. The edges 234 connect the nodes 232 to other nodes 232. Edges 234 may connect, or not connect, to any node(s) 232 regardless of which layer the node(s) 232 is in. That is, the nodes 232 may be sparsely and residually connected. For example, in some recurrent neural networks (RNN), nodes 232 in the output layer may be connected by edges 234 to nodes 232 in the input layer 238.

An NN 230 has at least two layers, where the first layer 238 is the "input layer" and the last layer 244 is the "output layer." Any intermediate layer 240, 242 is usually described as a "hidden layer." An NN 230 may have zero or more hidden layers 240, 242. An NN 230 with at least one hidden layer 240, 242 may be described as a "deep" neural network or "deep learning method." In general, an NN 230 may have more than one node 232 in the output layer 244. In these cases, the neural network 230 may be referred to as a "multi-target" or "multi-output" network.

Nodes 232 and edges 234 carry associations. Namely, every edge 234 is associated with a numerical value. The edge numerical values, or even the edges 234 themselves, are often referred to as "weights" or "parameters." While training an NN 230, a process that is described below, numerical values are assigned to each edge 234. Additionally, every node 232 is associated with a numerical value and may also be associated with an activation function. Activation functions are not limited to any functional class, but traditionally follow the form:

$$A = f\left(\sum_{i \in (incoming)} [(\text{node value})_i (\text{edge value})_i]\right), \quad \text{Equation (1)}$$

where i is an index that spans the set of "incoming" nodes 232 and edges 234 and $f$ is a user-defined function. Incoming nodes 232 are those that, when viewed as a graph (as in FIG. 2B), have directed arrows that point to the node 232 where the numerical value is being computed. Some functions $f$ may include the linear function $f(x)=x$, sigmoid function $$f(x) = \frac{1}{1 + e^{-x}},$$

and rectified linear unit function $f(x)=\max(0, x)$, however, many additional functions are commonly employed. Every node 232 in an NN 230 may have a different associated activation function. Often, as a shorthand, activation functions are described by the function $f$ by which it is composed. That is, an activation function composed of a linear function $f$ may simply be referred to as a linear activation function without undue ambiguity.

When the NN 230 receives an input, the input is propagated through the network according to the activation functions and incoming node values and edge values to compute a value for each node 232. That is, the numerical value for each node 232 may change for each received input while the edge values remain unchanged. Occasionally, nodes 232 are assigned fixed numerical values, such as the value of 1. These fixed nodes are not affected by the input or altered according to edge values and activation functions. Fixed nodes are often referred to as "biases" or "bias nodes" as displayed in FIG. 2B with a dashed circle.

In some implementations, the NN 230 may contain specialized layers, such as a normalization layer, pooling layer, or additional connection procedures, like concatenation. One skilled in the art will appreciate that these alterations do not exceed the scope of this disclosure.

The number of layers in an NN 230, choice of activation functions, inclusion of batch normalization layers, and regularization strength, among others, may be described as "hyperparameters" that are associated to the ML model. It is noted that in the context of ML, the regularization of a ML model refers to a penalty applied to the loss function of the ML model. The selection of hyperparameters associated to a ML model is commonly referred to as selecting the ML model "architecture."

Once a ML model, such as an NN 230, and associated hyperparameters have been selected, the ML model may be trained. To do so, M training pairs may be provided to the NN 230, where M is an integer greater than or equal to one. The variable m maintains a count of the M training pairs. As such, m is an integer between 1 and M inclusive of 1 and M where m is the current training pair of interest. For example, if M=2, the two training pairs include a first training pair and a second training pair each of which may be generically denoted an mth training pair. In general, each of the M training pairs includes an input and an associated target output. Each associated target output represents the "ground truth," or the otherwise desired output upon processing the input. During training, the NN 230 processes at least one input from an mth training pair to produce at least one output. Each NN output is then compared to the associated target output from the mth training pair.

Returning to the NN 230 in FIG. 2B, the NN 230 may be trained by first assigning initial values to the edges 234. These values may be assigned randomly, according to a prescribed distribution, manually, or by some other assignment mechanism. Once edge values have been initialized, the NN 230 may act as a function such that it may receive an input from an mth training pair and produce an output. At least one input is propagated through the neural network 230 to produce an output. The M training pairs is discussed in more detail below.

The comparison of the NN output to the associated target output from the mth training pair is typically performed by a "loss function." Other names for this comparison function include an "error function," "misfit function," and "cost function." Many types of loss functions are available, such as the log-likelihood function. However, the general characteristic of a loss function is that the loss function provides a numerical evaluation of the similarity between the NN output and the associated target output from the mth training pair. The loss function may also be constructed to impose additional constraints on the values assumed by the edges 234. For example, a penalty term, which may be physics-based, or a regularization term may be added. Generally, the goal of a training procedure is to alter the edge values to promote similarity between the NN output and associated target output for most, if not all, of the M training pairs. Thus, the loss function is used to guide changes made to the edge values. This process is typically referred to as "backpropagation."

While a full review of the backpropagation process exceeds the scope of this disclosure, a brief summary is provided. Backpropagation consists of computing the gradient of the loss function over the edge values. The gradient indicates the direction of change in the edge values that results in the greatest change to the loss function. Because the gradient is local to the current edge values, the edge values are typically updated by a "step" in the direction indicated by the gradient. The step size is often referred to as the "learning rate" and need not remain fixed during the training process. Additionally, the step size and direction may be informed by previous edge values or previously computed gradients. Such methods for determining the step direction are usually referred to as "momentum" based methods.

Once the edge values of the NN 230 have been updated through the backpropagation process, the NN 230 will likely produce different outputs than it did previously. Thus, the procedure of propagating at least one input from an mth training pair through the NN 230, comparing the NN output with the associated target output from the mth training pair with a loss function, computing the gradient of the loss function with respect to the edge values, and updating the edge values with a step guided by the gradient is repeated until a termination criterion is reached. Common termination criteria include, but are not limited to, reaching a fixed number of edge updates (otherwise known as an iteration counter), reaching a diminishing learning rate, noting no appreciable change in the loss function between iterations, or reaching a specified performance metric as evaluated on the m training pairs or separate hold-out training pairs (often denoted "validation data"). Once the termination criterion is satisfied, the edge values are no longer altered and the neural network 230 is said to be "trained."

In one or more embodiments, the safety system 100 may generate the HIM 208, using a NN, including a CNN. More specially, an open source repository with existing models for PPE detection may be implemented as the ML model. For example, in accordance with one or more embodiments, the safety system 100 may generate the HIM 208 based on a support vector machine (SVM) regressor. For example, embodiments disclosed herein may implement a fast or faster R-CNN with a SVM classifier applied to the features extracted by the CNN. In alignment with the described use of the machine-learned model of the present disclosure, SVM, once trained, may be considered a function which accepts an input and produces an output. As such, the HIM 208 is constructed on SVM regressor that receives image data and return results: whether any humans who are in or are about to enter the area of risk may be identified, how many humans may be identified, and the body frame of the humans.

In some embodiments, the safety system 100 may generate the HIM 208 on histogram of oriented gradients (HOG), or in combination of HOG and a NN 230. HOG is a type of feature extraction algorithm employed in computer vision. Since introduced in 2005, HOG has been used to detect objects like humans in image data. HOG proceeds by first dividing the image data into sections. A window is divided into blocks, and each block is divided into cells. HOG computes a magnitude of gradient and gradient orientation of the pixels in cells based on the image data to be used in orientation bin assignment. Using the calculated orientation of pixels in each cell (0 to 360 degrees), the magnitude of each pixel is added to the value of the bin. After normalization procedure, HOG obtains features by concatenating all values in the selected window. Descriptors obtained by HOG may be analyzed with a classifier algorithm such as SVM to arrive at the HIM 208.

Another activation function may be used for the analysis of descriptors. For example, Softmax converts a vector of a number into a vector of a probability. Softmax may be introduced, instead of SVM, for the generation of the HIM 208.

In other embodiments, the safety system 100 may generate the HIM 208 and the PDM 210, using any other suitable AI network, alternatively or additionally, including fast Region-based Convolutional Neural Network (R-CNN) and/ or You Only Look Once (YOLO). While R-CNN starts analysis from selecting key regions in images, YOLO saves such process. YOLO establishes a single convolutional network that predicts bounding boxes and determines class probabilities for the bounding boxes. Algorithms trained using AI networks such as YOLO, may receive image data, apply the HIM 208 or the PDM 210, and return results. As a result, the safety system 100 may determine: presence or absence of humans who are in or are about to enter the area of risk; the number thereof; the body frame of the humans; and the humans' compliance with the PPE requirements.

The safety system 100 may identify a person who is in or is entering the area of risk being monitored based on the image data, using the HIM 208. The safety system 100 may determine whether each identified human is wearing the PPE based on the image data, using the PDM 210.

Referring to FIG. 3, schematic front views of workers wearing PPE is depicted. PPE, commonly used by electrical workers for many years, provides head to toe protection from heat/fire and electricity for workers. PPE is the last line of defense against arc flashes and one of the most important preventive measures.

As illustrated in FIG. 3, there are at least a few types of PPE that workers wear depending on the degree of hazards from an arc flash (Categories 1 to 4). An example PPE that offers the lowest protection 300 is shown in the left column, an example PPE that offers medium protection 302 is shown in the middle column, and an example PPE that offers the highest protection 304 is shown in the right column in FIG. 3.

The category 1 PPE 300 is used for any arc flash that does not exceed thermal heat of 4 cal/cm$^2$. In category 1, only a single layer of PPE including the following shields, is considered necessary: (1) long-sleeve shirt and pants, or coveralls made of heat and frame-resistant fiber (e.g. untreated cotton) with a 4 cal/cm$^2$ minimum arc rating 308; (2) arc flash suit hood or face shield with wraparound guarding 312; (3) arc-rated jacket, parka, rainwear, or arc-rated hard hat liner 306; and (4) hard hats 310; safety glasses or safety goggles (not shown); hearing protection (not shown); voltage-rated rubber gloves with heavy-duty leather gloves 314; and leather footwear 316.

The category 2 PPE 302 is used for any arc flash that does not exceed thermal heat of 8 cal/cm$^2$. In category 2, a single layer of PPE including the following shields, is considered necessary: (1) long-sleeve shirt and pants, or coveralls made of heat and frame-resistant fiber with a 8 cal/cm$^2$ minimum arc rating 318; (2) arc flash suit hood or face shield with wraparound guarding 312; (3) arc-rated balaclava, arc-rated jacket, parka, rainwear, or arc-rated hard hat liner (not shown); and (4) hard hats 310; safety glasses or safety goggles (not shown); hearing protection (not shown); voltage-rated rubber gloves with heavy duty leather gloves 314; and leather footwear 316.

The category 3 PPE 304 is used for any arc flash that does not exceed thermal heat of 25 cal/cm$^2$. In category 3, multiple layers of PPE including the following shields, are considered necessary: (1) long-sleeve shirt and pants, or arc-rated coveralls, arc flash suit jacket, arc flash suit pants, made of heat and frame-resistant fiber with a 25 cal/cm$^2$ minimum arc rating 320; (2) arc flash suit hood 322; (3) arc-rated gloves 324; jacket, parka, rainwear, or arc-rated hard hat liner (not shown); and (4) hard hats 310; safety glasses or safety goggles (not shown); hearing protection (not shown); and leather footwear 316.

The category 4 PPE 304 is used for any arc flash that does not exceed thermal heat of more than 25 cal/cm$^2$. In category 4, multiple layers of PPE including the following shields, are considered necessary: (1) long-sleeve shirt and pants, or arc-rated coveralls, arc flash suit jacket, arc flash suit pants, made of heat and frame-resistant fiber with a 40 cal/cm$^2$ minimum arc rating 320; (2) arc flash suit hood 322; (3) arc-rated gloves 324; jacket, parka, rainwear, or arc-rated hard hat liner (not shown); and (4) hard hats 310; safety glasses or safety goggles (not shown); hearing protection (not shown); and leather footwear 316.

As noted constantly by field workers, properly selected PPE can prevent severe arc flash incidents and has saved lives. Workers are supposed to be clothed in proper PPE that withstands the degree of frame/heat from a potential arc flash. Absent protection offered by PPE, workers can suffer a catastrophic thermal injury and lose their lives when an energized electrical circuit.

Figure 4:
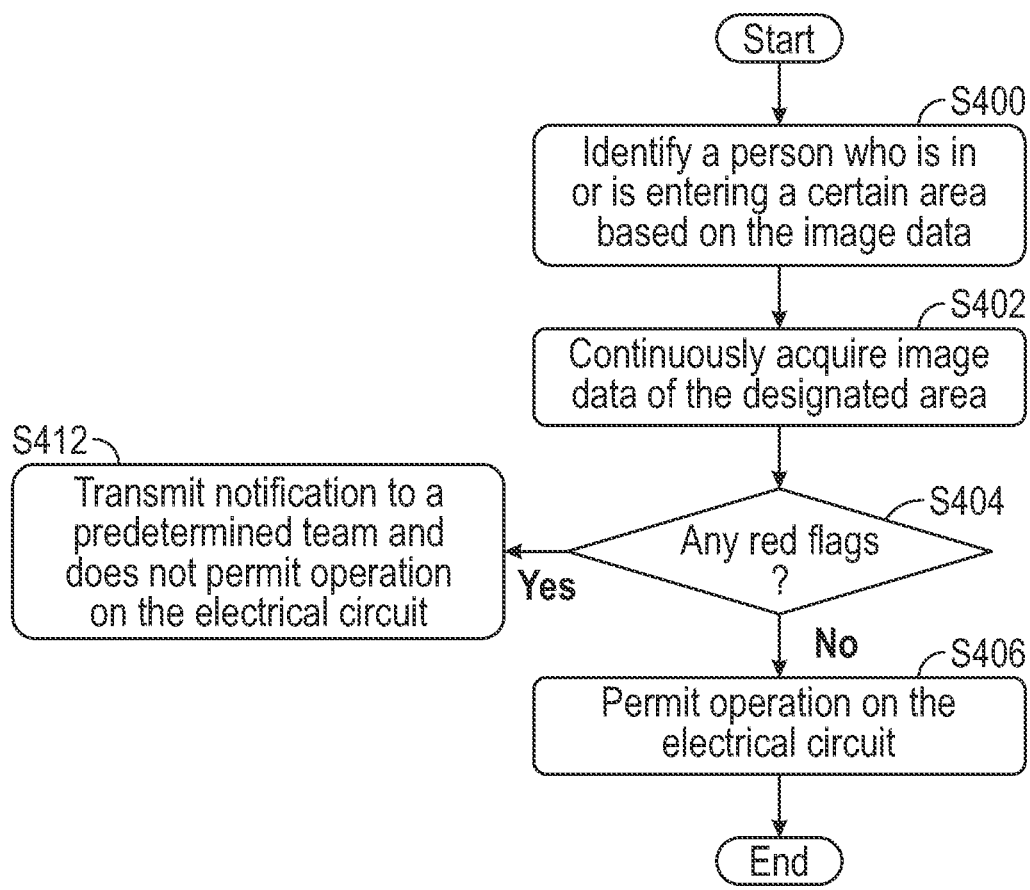
FIG. 4 shows a flow chart of a method of preventing and/or detecting arc flash injuries, in accordance with one or more embodiments.

FIG. 4 shows a flowchart of a method of preventing and/or detecting arc flash injuries to those who are in or are entering an area of risk, in accordance with one or more embodiments. In FIG. 4, the electrical circuit poses a risk of physical injury from an arc flash to a human in the area of risk. One or more of the individual steps shown in FIG. 4 may be omitted, repeated, and/or performed in a different order than the order shown in FIG. 4. Accordingly, the scope of the disclosure should not be limited by the specific arrangement as depicted.

Initially, at Step 400, the hardware processor 1045 of the safety system 100 may identify a person who is in or is entering the area of risk based on the image data using the HIM 208. For example, a frame of an identified human may be identified and the hardware processor 1045 of the safety system 100 may return a total number of the identified humans as output, using the HIM 208. More specifically, processor 1045 may generate the HIM 208 by obtaining one or more images and evaluating features of pixels in each of the one or more images, constructing an artificial intelligence network based on ML models, and training the artificial intelligence network by using at least a part of the one or more images.

In addition, the safety system 100 may generate the HIM 208 by obtaining features for each of the one or more images, using HOG 250. In some instances, the features are calculated by analyzing gradients of the pixels of the one or more images. Optionally, in analyzing the gradients, a magnitude of gradient and gradient orientation of the pixels of the one or more images may be computed.

As explained above, the safety system 100 may comprise the AI-enabled circuit that may communicate with the image acquisition device 132 and the hardware processor 1045. The generation of the HIM 208 may be performed at the AI-enabled circuit, for example, using Edge computing devices. Edge AI is a system that uses machine learning algorithms to make use of the data generated by a local hardware device (local means that is not connected to the internet/cloud). This reduces communication costs usually rise from the model being deployed on cloud. Edge AI takes data and its processing to the closet point of interaction with the user whether it is a computer, an IOT device, or an edge device like it is the case on the streaming camera. Such edge devices are coupled to the streaming camera. Example edge device includes but are not limited to: Jetson, Coral, INTEL NCS2.

The HIM 208 may be trained by the AI-enabled circuit that collects and processes the image data captured by the image acquisition device 132 (e.g., camera). The AI-enabled circuit may perform the process offline as well as online.

The hardware processor 1045 of the safety system 100 generates the PDM 210 that determines whether each identified human is wearing the PPE based on the image. In some examples, the safety system 100 may generate the PDM 210 on the AI-enabled circuit.

In some implementations, the hardware processor 1045 of the safety system 100 may generate the PDM by: evaluating features of pixels in each of the one or more images.

At step 402, the hardware processor 1045 may continuously acquire image data about the area of risk. Specifically, the processor may transmit a command to the image acquisition device 132 to acquire the image data about the area of risk. The safety system 100 may continuously obtain image data as the image acquisition device 132 captures an image/picture (Image/picture acquisition 206) or a streaming video.

At step 404, the safety system 100 may determine if there are any red flags present that need immediate attention. For example, a red flag may be that the identified human is not PPE compliant. Alternatively, in one or more embodiments, the red flag may be that the identified human needs medical attention because they are in a horizontal position (i.e., they fell). Another type of red flag may be an arc-flash incident. Specifically, as part of analyzing whether any red flags are present, the hardware processor 1045 may determine whether each person is wearing the required PPE based on the image data, using the PDM 210 according to one or more embodiments. In some implementations, upon concluding that the person is wearing the PPE, the processor 1045 may permit operation on the electrical circuit, at step 406. In such circumstances, the hardware processor 1045 of the safety system 100 may, for example, unlock the electrical lock 124 of the door of the switchgear enclosure or otherwise provide access to electrical equipment that poses a risk of arc flash incidents.

In other embodiments, processor 1045 of the safety system 100 may, upon concluding that the person is wearing the PPE, lift the inhibition by the first permissive contact 812*b* and permit operation on the electrical circuit by closing the first permissive contact 812*b* to allow activation of the trip coil 804. The trip coil 804 activation opens the circuit breaker 802. Additionally, the hardware processor 1045 of the safety system 100 may, upon concluding that the person is wearing the PPE, lift the inhibition by the second permissive contact 812*a* after the operation, and close the second permissive contact 812*a* to allow activation of the close coil 806. As a result, the circuit breaker 802 closes. In other implementations, the processor 1045 may, upon concluding that the person is wearing the PPE, permit operation on the electrical circuit by unlocking the actuator lock 604 to allow racking in and out the switchgear 108 with the rack handle 608.

In cases where any identified human is not wearing the required PPE and is therefore not PPE compliant, the hardware processor 1045 may transmit notification to a predetermined team about any identified red flag (e.g., PPE non-compliance), at step 412. In response to such a scenario, the safety system 100 may determine whether the person in the picture needs medical attention, applying the IDM 226. In one or more embodiments, upon concluding that the identified human needs medical attention, the safety system 100 may transmit notification to the predetermined emergency service at step 412.

Figure 5:
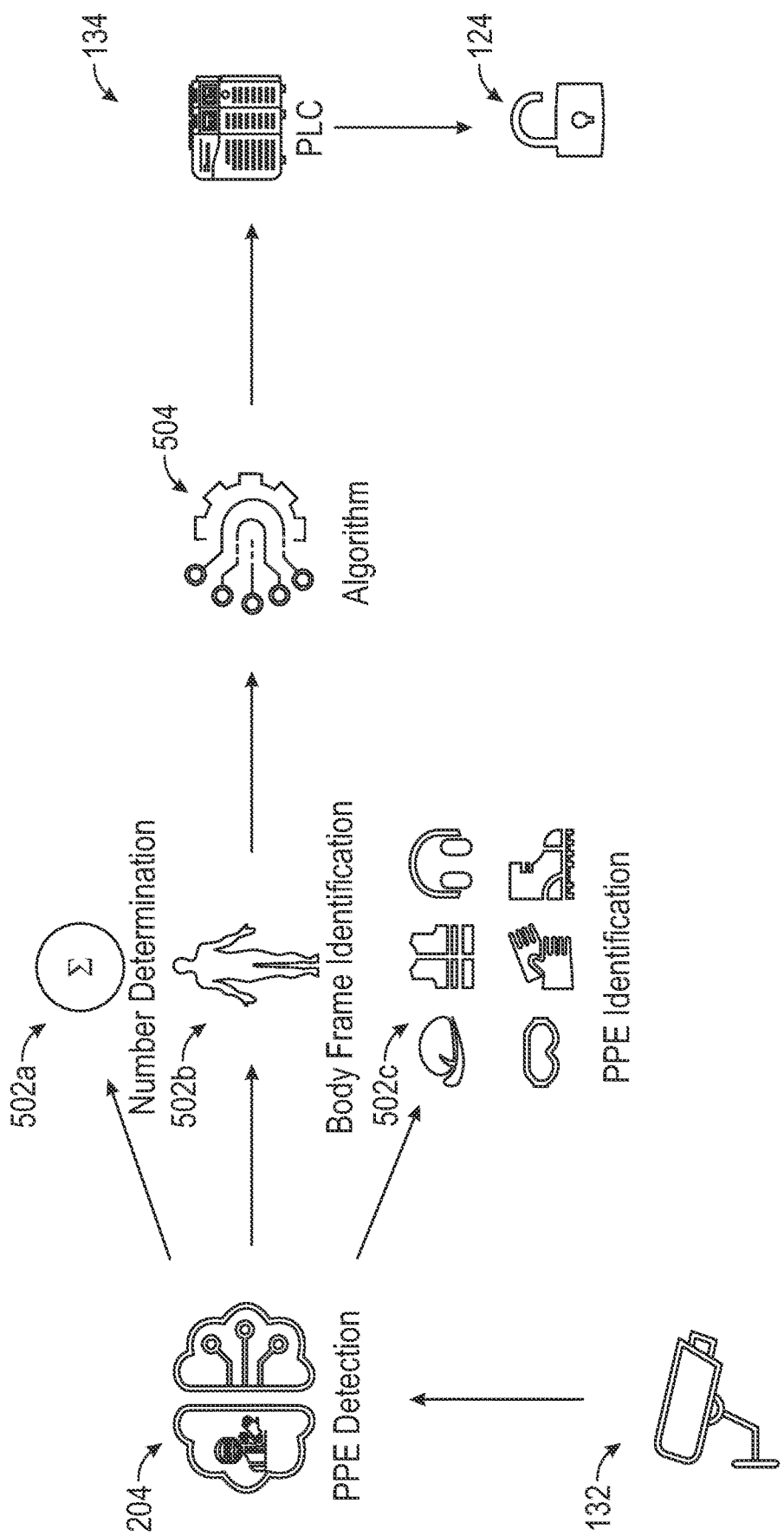
FIG. 5 shows a schematic diagram of operations of the safety system in accordance with one or more embodiments.

A schematic diagram of the safety system 100 is shown in FIG. 5. In some implementations, the safety system 100 may use the following steps to determine whether each person is wearing the PPE (PPE Detection 204) based on the image data. For example, as the first step, the safety system 100 may determine a number of identified persons who are in or are entering the area of risk based on the image data (Number Determination 502*a*), using the HIM 208. Further, the safety system 100 may identify a body frame of the person who is in or is entering the area based on the image data (Body Frame Identification 502*b*), using the HIM 208. The safety system 100 may determine the type of shields that are situated within the body frame of the person based on the image data, using the PDM 210.

In example implementations, the HIM 208 and the PDM 210 may be generated using any one or more of the following: HOG 250, Fast R-CNN 270, SVM, or hard negative mining algorithms.

The safety system 100 may permit operation on the electrical circuit upon concluding that the person is wearing the PPE. For example, upon concluding that the person is wearing the PPE, the safety system 100 (or PLC 134) may unlock the electrical lock 124 of the door of the switchgear enclosure.

Figure 6A:
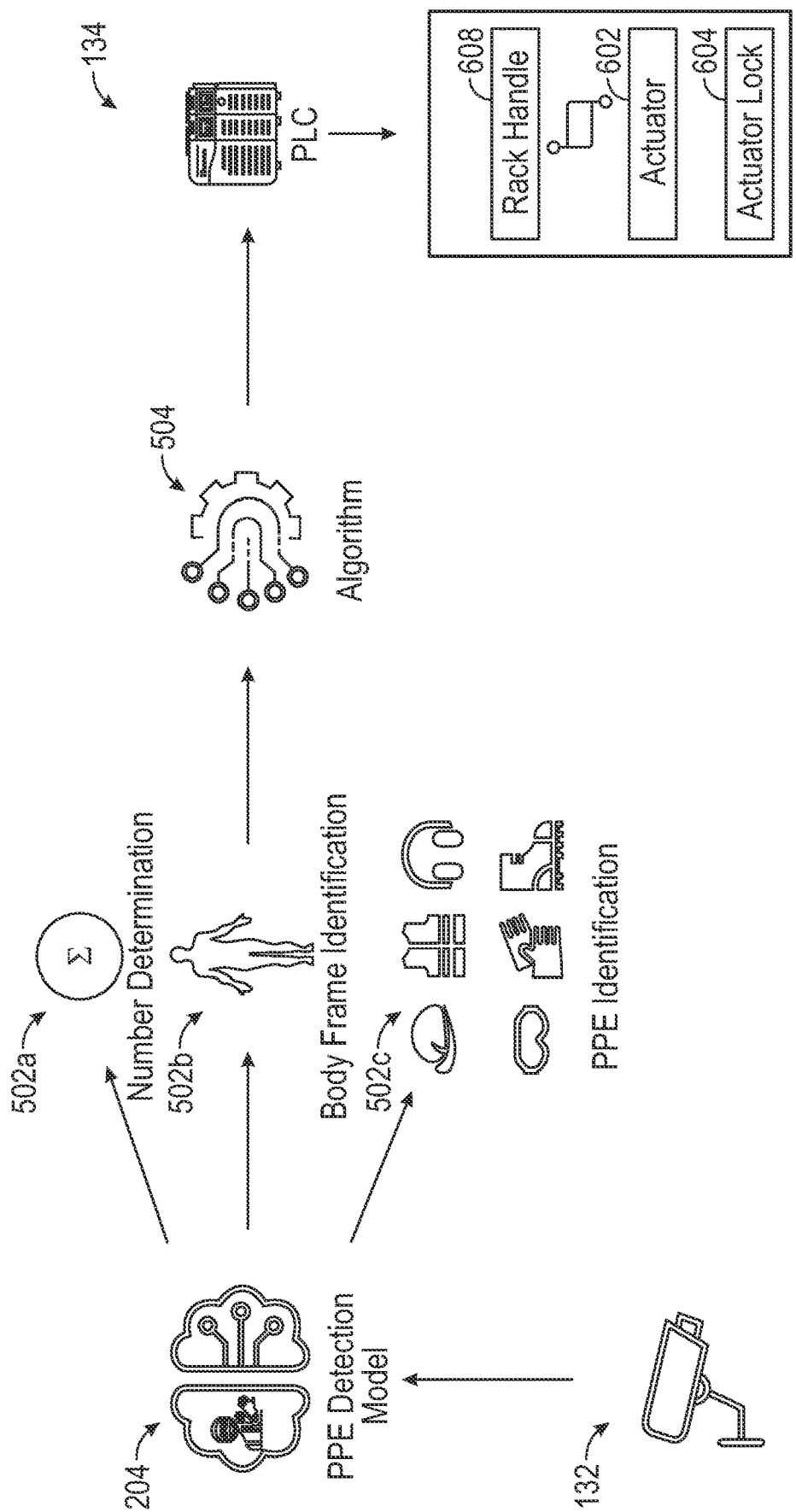
FIG. 6A shows a schematic diagram of operations of the safety system in accordance with one or more embodiments.

Turning to FIG. 6A, a schematic diagram of operations of the safety system 100 in accordance with one or more embodiments is illustrated. As depicted in FIG. 6A, the safety system 100 may automate the lock 604 to racking process to protect workers from arc flash injuries.

When workers require access to the electrical circuit for maintenance operation and the like, the workers may need to rack in/out the breaker 112 with use of the rack handle 608. The safety system 100 may, after determining that each identified human/person who is entering the area of risk is wearing the PPE, transmit a command signal to PLC 134 to autonomously permit the actuator lock 604 to open. For example, the command signal directs PLC 134 to open the actuator lock 604. The actuator lock 604 that prevents operations on the rack handle 608 may be unlocked by PLC's 134 signal. When the actuator lock 604 is unlocked, the operation with the rack handle 608 may be performed. As explained above, PLC 134 may execute algorithm 504 based on the PDM 210 and transmit the signal autonomously.

Figure 6C:
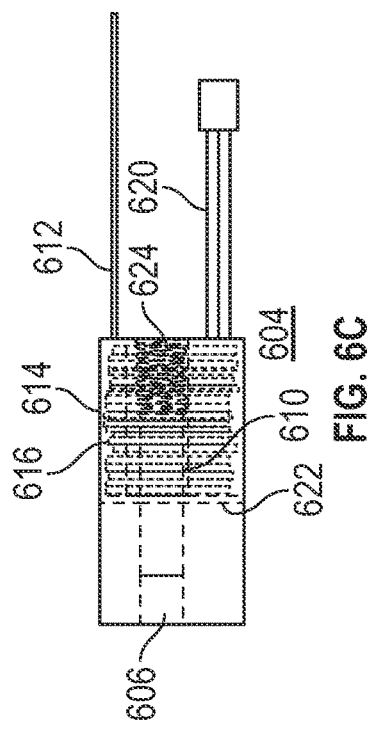
FIGS. 6C and 6D show schematic diagrams showing implementations of the safety system with an actuator in accordance with one or more embodiments.
Figure 6D:
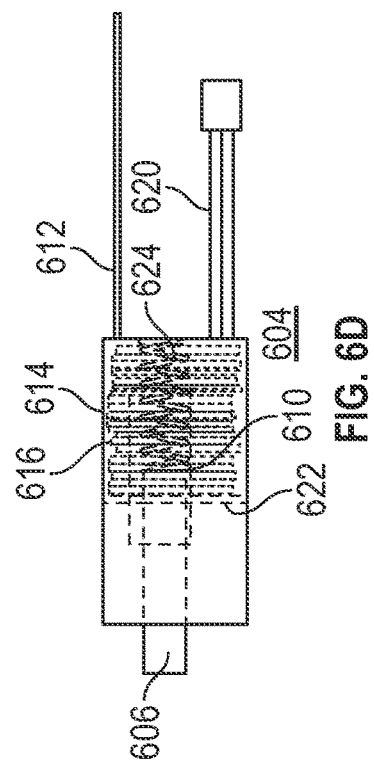
Figure 6B:
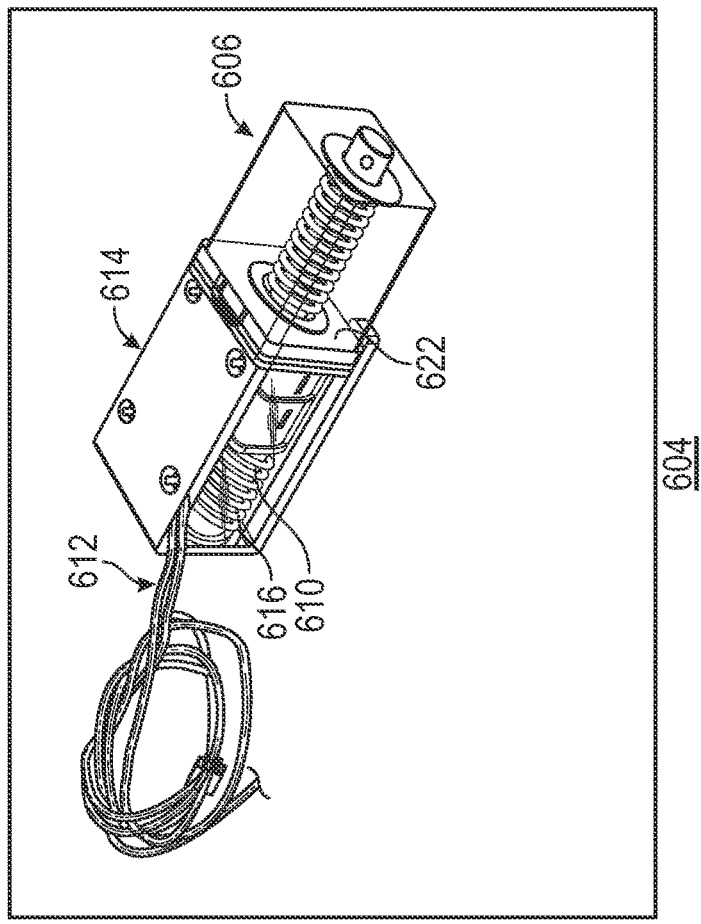
FIG. 6B shows a perspective view of an actuator lock in accordance with one or more embodiments.

In FIG. 6B, a perspective view of the actuator lock 604 according to one or more embodiments is shown. The actuator lock 604 may comprise a plunger 610, a coil 616, a housing 614, and a latch bar 606 as illustrated in FIG. 6B. The actuator lock 604 may be communicably coupled to PLC 134 via a wiring 612. The coil 616 may extend or retract the latch bar 606 as mechanically controlled by movement of the plunger 610.

FIGS. 6C and 6D show side views of the actuator lock 604 according to one or more embodiments. FIG. 6C shows the actuator lock 604 in the open mode. FIG. 6D shows the actuator lock 604 in the closed mode.

In some examples of the actuator locks 604, a bar or a spindle 620 may be attached to the actuator lock 604 and may enable the actuator lock 604 to move linearly back and forth. The latch bar 606, in its extended form, prevents a worker's insertion of the rack handle 608 and prohibits access to the breaker 112 with the rack handle 608. The latch bar 606 may retract as prompted by PLC'134 s signal to the actuator lock 604.

Figure 7:
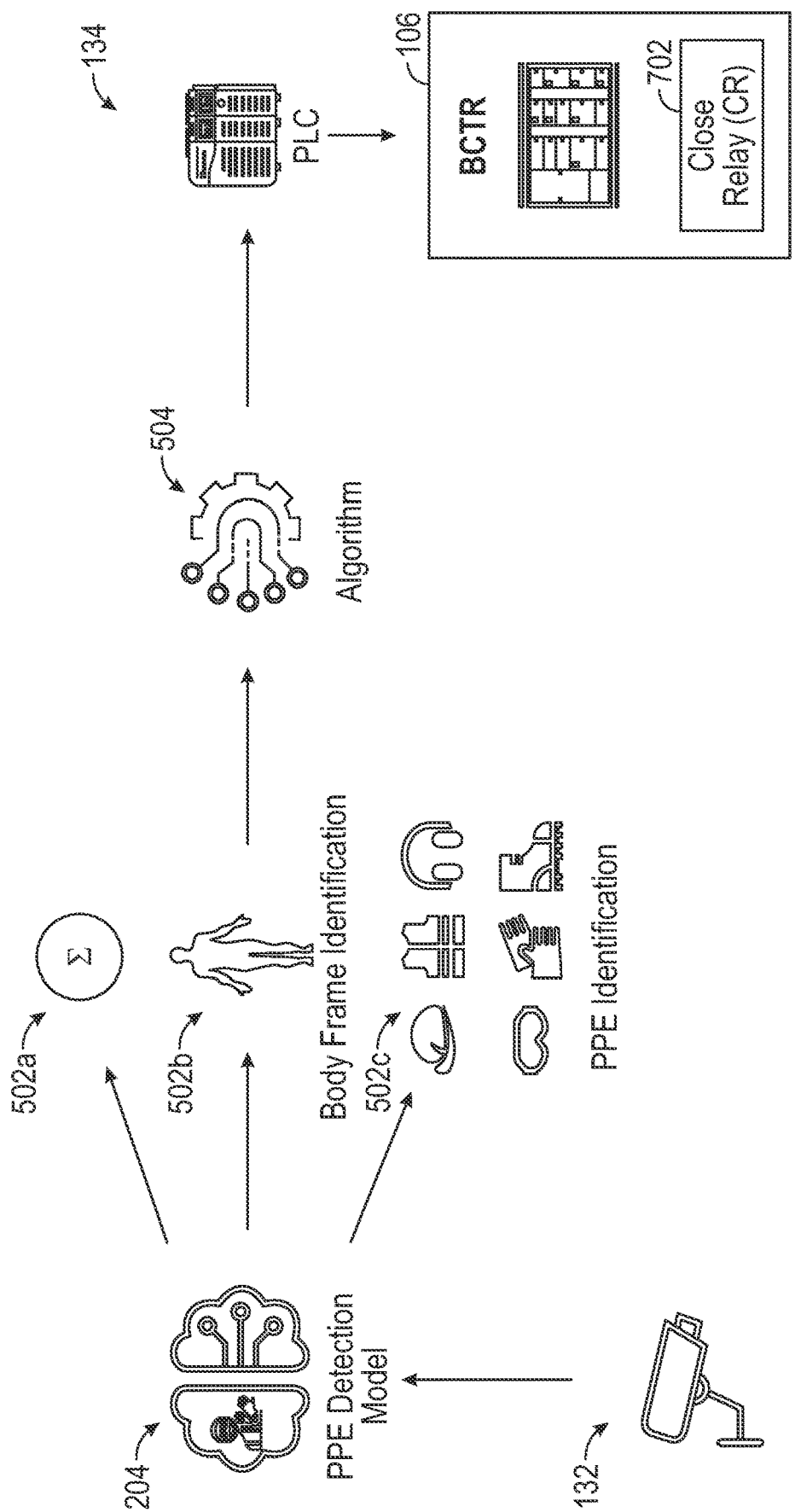
FIG. 7 shows a schematic diagram of operations of the safety system in accordance with one or more embodiments.

Referring to FIG. 7, a schematic diagram of operation of the safety system 100 is shown. Using the HIM 208, e.g., on the AI-enabled circuit, the safety system 100 may determine a number of the person who is in or is entering the area of risk, for instance, a few feet from the switchgear enclosure (Number Determination 502*a*). The person may need to access and make a breaker status change before or after the operation on the electrical circuit.

The safety system 100 may not allow the person who is entering the area of risk to operate on the electrical circuit without confirming that each of the person is wearing the PPE according to one or more embodiments. The safety system 100 (or PLC 134) may determine the body frame of each of the person (Body Frame Identification 502b), using the HIM 208, and determine whether the PPE requirement is satisfied by each of the person, using the PDM 210 (PPE Identification 502c).

Upon determining that each of the person is wearing the PPE, the safety system 100 may transmit a command signal to PLC 134 to permit the operation on the electrical circuit. The command signal instructs PLC 134 to direct BCTR 106 to change the circuit breaker's 802 status from closed to open or open to closed. Alternatively, PLC 134 may execute the algorithm 504 and autonomously transmit the signal to BCTR 106.

In FIG. 8A, a schematic diagram highlighting a breaker switch procedure of the safety system 100 is provided as a safety measure in addition to other protective mechanisms. Normally, a relevant part of the electrical circuit is in a closed-breaker state, and live electrical current is flowing. Workers need to open the circuit breaker 802 to interrupt the electrical current before starting to operate on the electrical circuit. A switch 110 may need to be turned to "Trip" to activate the trip coil (TC) 804.

In accordance with one or more embodiments, however, the permissive contact 812b prohibits energization of the trip coil 804. Thus, the trip coil 804 may not be energized until the permissive contact 812b is closed (e.g., when BCTR 106 receives an analog signal from PLC 134, which may be generated by converting the command signal from the safety system 100). For example, in turning a switch 110 to "Trip," the safety system 100 and PLC 134 may automate the breaker switch procedure and determine whether each of identified persons who are in or about to enter the certain area of risk is wearing the PPE. The safety system 100 may send the command signal to permit the person's operation on the electrical circuit, upon determining that each of identified persons who are in or about to enter the certain area of risk is wearing the PPE. PLC 134 may receive the command signal and direct BCTR 106 to lift prohibition by the permissive contact 812b against energization of the trip coil 804. Thus, the circuit breaker 802 may change from the closed status to the open status. Subsequently, a first regular contact 814b opens, and the trip coil 804 gets de-energized. A second regular contact 814a is prompted to close, which renders the circuit breaker 802 subjective to a closing signal from a close relay (CR) 702.

In FIG. 8B, a schematic diagram highlighting a breaker switch procedure of the safety system 100 according to one or more embodiments is shown. As discussed above, when the person's operation is permitted, the circuit breaker 802 changes into the open state, and electrical current stops flowing. When the person finishes the operation, the circuit breaker 802 needs to be closed to restore electrical current. Usually, the switch 110 needs to shift to the "Close," to energize the close relay 702. The close relay 702 then closes an auxiliary contact to energize a close coil (CC) 806. The safety system 100, after determining that each of the person who are in or about to enter the certain area of risk is wearing the PPE, may permit BCTR 106 to close the permissive contact 812a, which energizes the close relay (CR) 702. The close relay 702 then allows activation of the close coil (CC) 806, to close the circuit breaker 802.

In some embodiments, when BCTR 106 receives an analog signal from PLC 134 that is generated by converting the command signal from the safety system 100, the prohibition by the permissive contact 812a is lifted. For example, the safety system 100 may, upon determining that each identified human who is in or is entering the certain area of risk is wearing the PPE, send the command signal to permit the person's operation on the electrical circuit. Upon receipt of the command signal, in some implementations, PLC 134 directs BCTR 106 to stop prohibition of energization of the close coil (CC) 806. The permissive contact 812a may close to allow energization of the close coil 806. As a result, the circuit breaker 802 may change from the open status to the closed status.

Figure 9A:
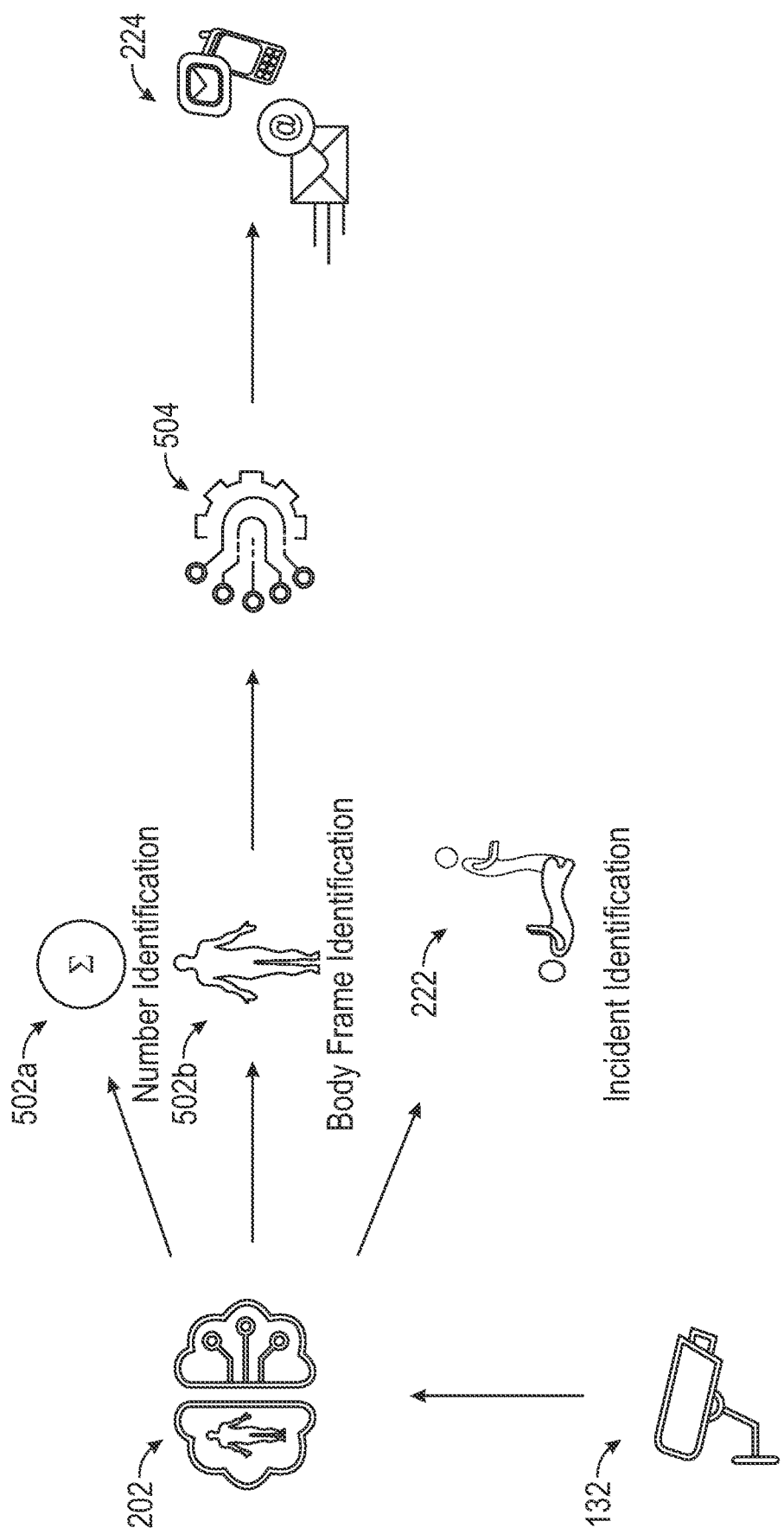
FIG. 9A shows a schematic diagram of operations of the safety system in accordance with one or more embodiments.

Referring to FIG. 9A, a schematic diagram of the safety system 100 in accordance with one or more embodiments is shown.

As illustrated in FIG. 9A, the safety system 100 may obtain the image data about the certain area acquired by the image acquisition device 132 (e.g., a stream camera) on an ongoing basis. The safety system 100 identifies a person who is in or is entering the area of risk based on the image data, using the HIM 208.

The safety system 100 may also detect an occurrence of a violation of the PPE requirement by acquiring the image data on the area of risk, identifying a person who is in or is about to enter the area based on the image data, using the HIM 208, and determining whether each of the person is wearing the PPE based on the image data, using the PDM 210.

The IDM 226 may be generated to detect any incidents such as an injury, a fall, fainting, etc. of a human based on the image data captured by the image acquisition device 132. For example, the IDM 226 may be generated by: obtaining one or more images and evaluating features of pixels in the one or more images; constructing an artificial intelligence network; and training the artificial intelligence network by using at least a part of the one or more images. More specifically, training of the IDM 226 may use features of pixels of the one or more images as input into the artificial intelligence network. The safety system 100 may obtain learned classifiers of objects to the one or more images and compare with true values of the objects. In one or more embodiments, the main task of the IDM 226 is detecting if human bodies are injured and/or fainted. The model is trained on historical images that can either be publicly, commercially available, or CGI data. The input of the model is the stream from the steaming camera, while the output is a boolean indicator confirming or disconfirming a detection of an injury/faint.

Figure 9B:
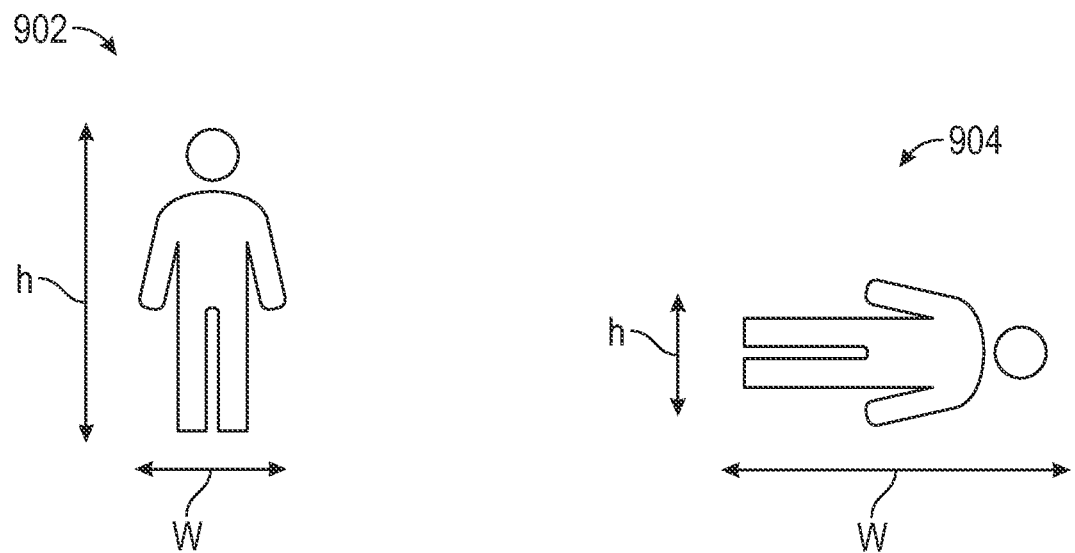
FIG. 9B shows a schematic illustration of incident detection algorithm in accordance with one or more embodiments.

Moving to FIG. 9B, a model schematic illustration of the IDM 226 in accordance with one or more embodiments is shown. As explained in relation to FIG. 9A, the safety system 100 may obtain a picture of the area of risk with an image acquisition device 132, e.g., a stream camera, on an ongoing basis; apply the HIM and identify a person in the picture who is in or is about to be in the area of risk.

In one or more implementations of the IDM 226, one or more images may include images depicting a standing human 902 and images depicting a lying human 904. In the former images 902, a frame of the human's body demonstrates that the human's height from the ground is much longer than the human's width. In the latter images 904, a frame of the human's body demonstrates that the human's height from the ground is much shorter than the human's width. This way, the IDM 226 may be trained to distinguish images depicting an injured/fallen/fainted human from a normal human.

In such implementations, the IDM 226 may detect the fact that the human is injured and/or fainted by using the trained IDM 226 generated by the artificial intelligence network.

Accordingly, the safety system 100 may apply the IDM 226 and determine whether the person in the picture needs medical attention. In applying the IDM 226, the safety system 100 may transmit a command to the AI-enabled circuit to determine whether the person in the picture needs medical attention on edge camera device.

Referring back to FIG. 9A, the artificial intelligence network may identify a location of the image acquisition device 132 that captured the image data (i.e., location of injury), time of the image acquisition (i.e., time of injury), and a type of suspected injury of the human in the image data. More specifically, in one or more embodiments, a communication message template is predefined in the AI network. This message may be in a preconfigured template to include at least: individual details, location, date/time, injury detection, injured body-location, type of injury. The safety system 100 is configured to send the message to the predefined emergency response team via email/SMS. This ensures that the injured operator will get medical attention at soonest, as in some occasions, operators may work alone at an electrical system unaccompanied with others and during off-peak hours.

The safety system 100 may also detect an occurrence of an arc flash by receiving measurements/signals from protective devices such as the breaker 112, the fuse 114, the switch 110, the PR/RLY 104, the IED 122, and the BCTR 106.

The safety system 100 may transmit notification or an alert to a predetermined emergency service (e.g., a security center, a guard, and EMS) upon concluding that the person needs medical attention (EMS Notification 224) in case of an arc flash, an injury/fall of a worker, and a violation of the PPE requirement. This will ensure that the injured person will receive medical attention at soonest, as in some occasions, even when the person works unaccompanied by others including off-peak hours. The alert may be generated in a predefined format. The alert may include but not limited to individual details of the person, a location, time, and a type of the injury, an afflicted area of the body, and the like.

Figure 10:
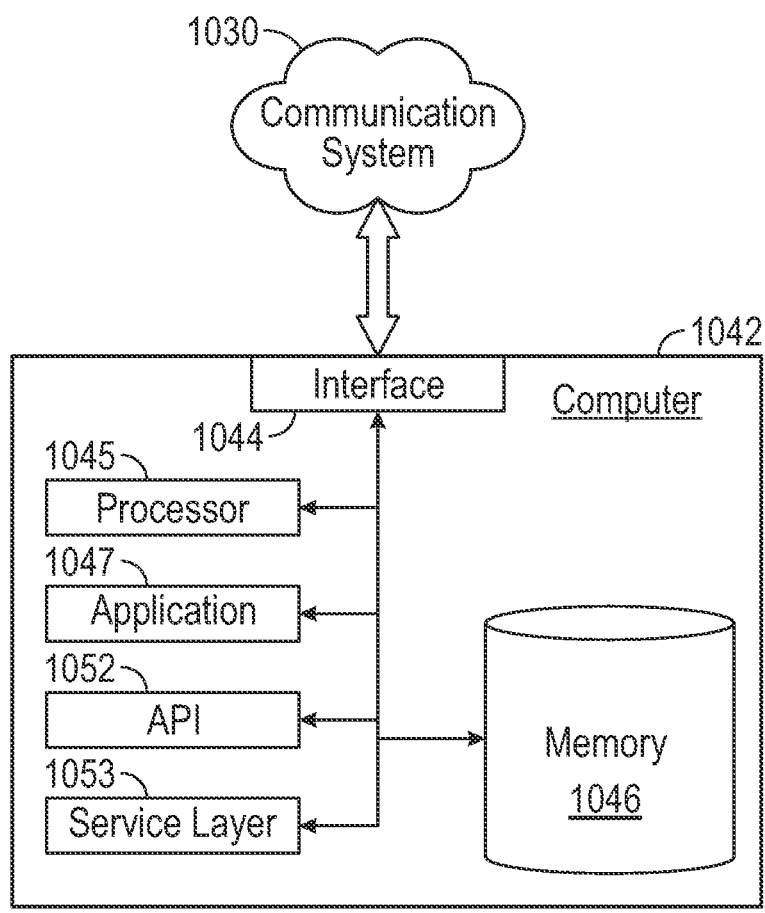
FIG. 10 shows a schematic diagram showing components of the safety system in accordance with one or more embodiments.

Referring to FIG. 10, FIG. 10 illustrates a block diagram of the computer system 200 used to provide functionalities that are associated with described algorithms, methods, functions, processes, flows, and procedures discussed in this disclosure, according to one or more embodiments. The illustrated computer (1042) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1042) may include a computer that includes an input device, such as a keypad, keyboard, touch screen, or other device that can accept user information, and an output device that conveys information associated with the operation of the computer (1042), including digital data, visual, or audio information (or a combination of information), or a GUI.

The computer (1042) can serve in a role as a client, network component, a server, a database or other persistency, or any other component (or a combination of roles) of a computer system for performing the subject matter described in the instant disclosure. The illustrated computer (1042) is communicably coupled with a communication system (1030). In some implementations, one or more components of the computer (1042) may be configured to operate within environments, including cloud-computing-based, local, global, or other environment (or a combination of environments).

At a high level, the computer (1042) is an electronic computing device operable to receive, transmit, process, store, or manage data and information associated with the described subject matter. According to some implementations, the computer (1042) may also include or be communicably coupled with an application server, e-mail server, web server, caching server, streaming data server, business intelligence (BI) server, or other server (or a combination of servers).

The computer (1042) can receive requests over the communication system (1030) from a client application (for example, executing on another computer (1042) and responding to the received requests by processing the said requests in an appropriate software application. In addition, requests may also be sent to the computer (1042) from internal users (for example, from a command console or by other appropriate access method), external or third-parties, other automated applications, as well as any other appropriate entities, individuals, systems, or computers.

Each of the components of the computer (1042) can communicate using a system bus. In some implementations, any or all of the components of the computer (1042), both hardware or software (or a combination of hardware and software), may interface with each other or the interface (1044) (or a combination of both) over the system bus using an application programming interface (API) (1052) or a service layer (1053) (or a combination of the API (1052) and service layer (1053). The API (1052) may include specifications for routines, data structures, and object classes. The API (1052) may be either computer-language independent or dependent and refer to a complete interface, a single function, or even a set of APIs. The service layer (1053) provides software services to the computer (1042) or other components (whether or not illustrated) that are communicably coupled to the computer (1042). The functionality of the computer (1042) may be accessible for all service consumers using this service layer. Software services, such as those provided by the service layer (1053), provide reusable, defined business functionalities through a defined interface. For example, the interface (1044) may be software written in JAVA, C++, or other suitable language providing data in extensible markup language (XML) format or another suitable format. While illustrated as an integrated component of the computer (1042), alternative implementations may illustrate the API (1052) or the service layer (1053) as stand-alone components in relation to other components of the computer (1042) or other components (whether or not illustrated) that are communicably coupled to the computer (1042). Moreover, any or all parts of the API (1052) or the service layer (1053) may be implemented as child or sub-modules of another software module, enterprise application, or hardware module without departing from the scope of this disclosure.

The computer (1042) includes an interface (1044). Although illustrated as a single interface (1044) in FIG. 10, two or more interfaces (1044) may be used according to particular needs, desires, or particular implementations of the computer (1042). The interface (1044) is used by the computer (1042) for communicating with other systems in a distributed environment that are connected to the communication system (1030). Generally, the interface (1044) includes logic encoded in software or hardware (or a combination of software and hardware) and operable to communicate with the communication system (1030). More specifically, the interface (1044) may include software supporting one or more communication protocols associated with communications such that the communication system (1030) or interface's hardware is operable to communicate physical signals within and outside of the illustrated computer (1042).

The computer (1042) includes at least one computer processor or hardware processor (1045). Although illustrated as a single computer processor (1045) in FIG. 10, two or more processors may be used according to particular needs, desires, or particular implementations of the computer (1042). Generally, the computer processor or the hardware processor (1045) executes instructions and manipulates data to perform the operations of the computer (1042) and any algorithms, methods, functions, processes, flows, and procedures as described in the instant disclosure.

The computer (1042) also includes a memory (1046) that holds data for the computer (1042) or other components (or a combination of both) that can be connected to the communication system (1030). For example, memory (1046) can be a database storing data consistent with this disclosure. Although illustrated as a single memory (1046) in FIG. 10, two or more memories may be used according to particular needs, desires, or particular implementations of the computer (1042) and the described functionality. While memory (1046) is illustrated as an integral component of the computer (1042), in alternative implementations, memory (1046) can be external to the computer (1042).

The application (1047) is an algorithmic software engine providing functionality according to particular needs, desires, or particular implementations of the computer (1042), particularly with respect to functionality described in this disclosure. For example, application (1047) can serve as one or more components, modules, applications, etc. Further, although illustrated as a single application (1047), the application (1047) may be implemented as multiple applications (1047) on the computer (1042). In addition, although illustrated as integral to the computer (1042), in alternative implementations, the application (1047) can be external to the computer (1042).

There may be any number of computers (1042) associated with, or external to, a computer system containing computer (1042), wherein each computer (1042) communicates over the communication system (1030). Further, the term "client," "user," and other appropriate terminology may be used interchangeably as appropriate without departing from the scope of this disclosure. Moreover, this disclosure contemplates that many users may use one computer (1042), or that one user may use multiple computers (1042).

One or more embodiments disclosed herein have the following advantages. Disclosed herein is an intelligent system that uses AI and ML to analyze individuals at site to ensure they have complied with all required personal protective equipment (PPE) prior to conducting work with an electrical system. This has the potential to save lives and protect humans from an Arc-flash scenario. The system autonomously inhibits the operation of the electrical system if the individual is in violation of PPE via a built-in permissive interlock.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method of protecting individuals working at an electrical circuit, the method comprising:
   acquiring image data about an area of risk with an image acquisition device;
   identifying a human who is in or is about to enter the area of risk based on the image data;
   determining whether the identified human is wearing personal protective equipment (PPE) based on the image data; and
   permitting operation on the electrical circuit upon concluding that each of the identified human is wearing the PPE;
   generating a human identification model (HIM) that detects the human in an image comprising the image data,
   wherein the HIM is applied to the image data to identify the human in the area of risk;
   wherein the generating of the HIM that detects the human in an image comprises:
      obtaining one or more images and evaluating features of pixels in each of the one or more images;
      constructing an artificial intelligence network; and
      training the artificial intelligence network by using at least a part of the one or more images;
   wherein the electrical circuit poses a risk of physical injury to the human in the area of risk from an arc flash.

2. The method of claim 1, further comprising:
   determining whether the identified human needs medical attention using the artificial intelligence network; and
   transmitting notification to a predetermined emergency service upon concluding that the identified human needs medical attention.

3. The method of claim 1, further comprising:
   generating a PPE detection model (PDM) that determines whether the identified human is wearing the PPE based on the image,
   wherein the PDM is applied to the image data to determine whether the identified human is wearing the required PPE.

4. The method of claim 1, wherein the artificial intelligence network comprises machine learning models, and wherein the HIM and the PDM are generated using any one selected from the group consisting of: histogram of oriented gradients, Region-based Convolutional Neural Network, support vector machine, You Only Look Once (YOLO), and hard negative mining algorithms.

5. The method of claim 1, wherein the permitting operation on the electrical circuit comprises: unlocking an electrical lock of a door of a switchgear enclosure.

6. The method of claim 1, wherein the permitting operation on the electrical circuit comprises:
   closing a first permissive contact to allow activation of a trip coil for opening a circuit breaker; and
   closing a second permissive contact to allow activation of a close coil for closing a circuit breaker.

7. The method of claim 1, wherein the permitting operation on the electrical circuit comprises:
   unlocking an actuator lock to allow racking in and out a switchgear with a rack handle.

8. The method of claim 1, wherein the PPE comprises at least one of the following: an arc-rated long-sleeve shirt and pants, an arc-rated arc flash suit, or an arc-rated coverall.

9. The method of claim 8, wherein the PPE further comprises: arc-rated balaclava or flash suit hood, an arc-rated gloves, and safety footwear.

10. A system of protecting individuals working at an electrical circuit, comprising:
a hardware processor of a computer that:
receives image data about an area of risk acquired by an image acquisition device,
identifies a human who is in or is entering the area of risk based on the image data,
determines whether the identified human is wearing required PPE based on the image data, and
transmits a command signal that permits operation on then electrical circuit upon
determining that each of the identified human is wearing the required PPE;
an artificial intelligence network comprising machine learning models configured to generate a HIM that detects the human in an image;
wherein the HIM that detects the human in the image is generated by:
obtaining image data associated with one or more images;
constructing the artificial intelligence network;
training the artificial intelligence network by using at least a part of the image data; and
determining features of pixels in the image data; and
the image acquisition device that acquires the image data of the area of risk and
transmits the image data to the hardware processor,
wherein the electrical circuit poses a risk of physical injury to a human in the area of risk from an arc flash incident.

11. The system of claim 10, further comprising:
a switch that closes a first permissive contact to actuate a trip coil as prompted by the command signal,
wherein closure of the first permissive contact opens a circuit breaker in the electrical circuit and permits the operation on the electrical circuit.

12. The system of claim 10, further comprising:
an actuator lock that is opened to allow racking in and out a switchgear with a rack handle, as directed by the command signal.

13. The system of claim 10, wherein the machine learning models comprise at least one of: histogram of oriented gradients, fast Region-based Convolutional Neural Network, support vector machine, YOLO, or hard negative mining algorithms.

14. The system of claim 10, wherein the artificial intelligence network is further configured to
generate a PDM that determines whether each of the detected human is wearing the PPE based on the image.

15. The system of claim 10, further comprising: a safety device that opens a door of a switchgear enclosure to permit the operation on the electrical circuit as instructed by the command signal.

16. The system of claim 10,
wherein the safety device comprises: an electrical lock that is controlled by a programmable logical controller (PLC), and
wherein the PLC receives the command signal from the hardware processor.

17. The system of claim 10, wherein training the artificial intelligence network comprises: using the features of pixels by obtaining a magnitude of gradient and gradient orientation of the pixels in the image data, as input into at least one of the machine learning models; and obtaining learned classifiers.

* * * * *